United States Patent [19]
Hirabayashi et al.

[11] Patent Number: 5,903,366
[45] Date of Patent: May 11, 1999

[54] COLOR IMAGE ENCODING METHOD

[75] Inventors: Yasuji Hirabayashi, Tokyo; Hidefumi Ohsawa, Kawaguchi; Tadashi Yoshida, Ichikawa, all of Japan

[73] Assignee: Canon Kabushiki Kaisha, Tokyo, Japan

[21] Appl. No.: 08/136,619

[22] Filed: Oct. 15, 1993

Related U.S. Application Data

[63] Continuation of application No. 07/577,312, Sep. 4, 1990, abandoned.

[30] Foreign Application Priority Data

| Sep. 5, 1989 | [JP] | Japan | 1-230714 |
| Sep. 5, 1989 | [JP] | Japan | 1-230715 |
| Sep. 5, 1989 | [JP] | Japan | 1-230716 |
| Jun. 12, 1990 | [JP] | Japan | 2-154688 |

[51] Int. Cl.$^6$ .............................. H04N 1/46; H04N 1/417
[52] U.S. Cl. ................... 358/539; 358/261.1; 358/261.2; 358/430
[58] Field of Search .............................. 358/261.2, 261.1, 358/261.3, 261.4, 262.1, 430, 539, 135, 13; 382/56; 348/391, 394

[56] References Cited

U.S. PATENT DOCUMENTS

| 4,344,086 | 8/1982 | Mizuno | 358/261.2 |
| 4,613,948 | 9/1986 | Gharavi | 358/430 |
| 4,656,500 | 4/1987 | Mori | 358/430 |
| 4,974,071 | 11/1990 | Maeda | 358/75 |
| 4,992,889 | 2/1991 | Yamagami | 358/430 |
| 5,046,119 | 9/1991 | Hoffert et al. | 382/56 |
| 5,181,105 | 1/1993 | Udagawa et al. | 358/261.1 |
| 5,317,428 | 5/1994 | Osawa et al. | 358/261.2 |

FOREIGN PATENT DOCUMENTS

| 0395394 | 10/1990 | European Pat. Off. ....... H04N 1/417 |
| 2189966 | 11/1987 | United Kingdom . |

OTHER PUBLICATIONS

"Progressive Color Block Coding . . ." Algazi et al. IEEE 5 vol., 2970 pp. 1990.

"Compression of Black–White Images With Arithmetic Coding", IEEE Transactions On Communications, vol. Com–29, No. 6, Jun. 1981, Glen Langdon, Jr., pp. 1201–1209.

"Compression Of Black–White Images With Arithmetic Coding", IEEE Transactions On Communications, vol. COM–29, No. 6, pp. 858–867.

"Efficient Encoding of Colored Pictures in R,G,B, Components", IEEE Transactions On Communications, vol. COM–32, No. 11, pp. 1201–1209.

*Primary Examiner*—Thomas D. Lee
*Attorney, Agent, or Firm*—Fitzpatrick, Cella, Harper & Scinto

[57] ABSTRACT

A color image encoding method to encode a color image signal expressed by a plural number of color component signals, wherein the plural number of color component signals of a pixel of interest are input serially, encoding conditions are serially determined in relation to each color component signal of the pixel of interest input serially, and each color component signal of the pixel of interest input serially is encoded according to the encoding conditions determined serially.

16 Claims, 15 Drawing Sheets

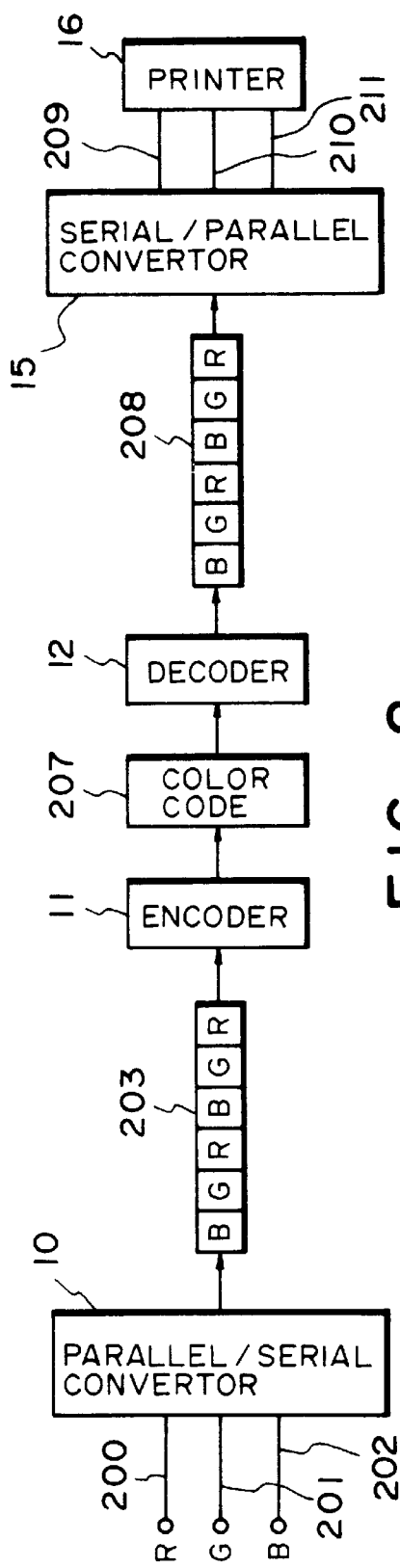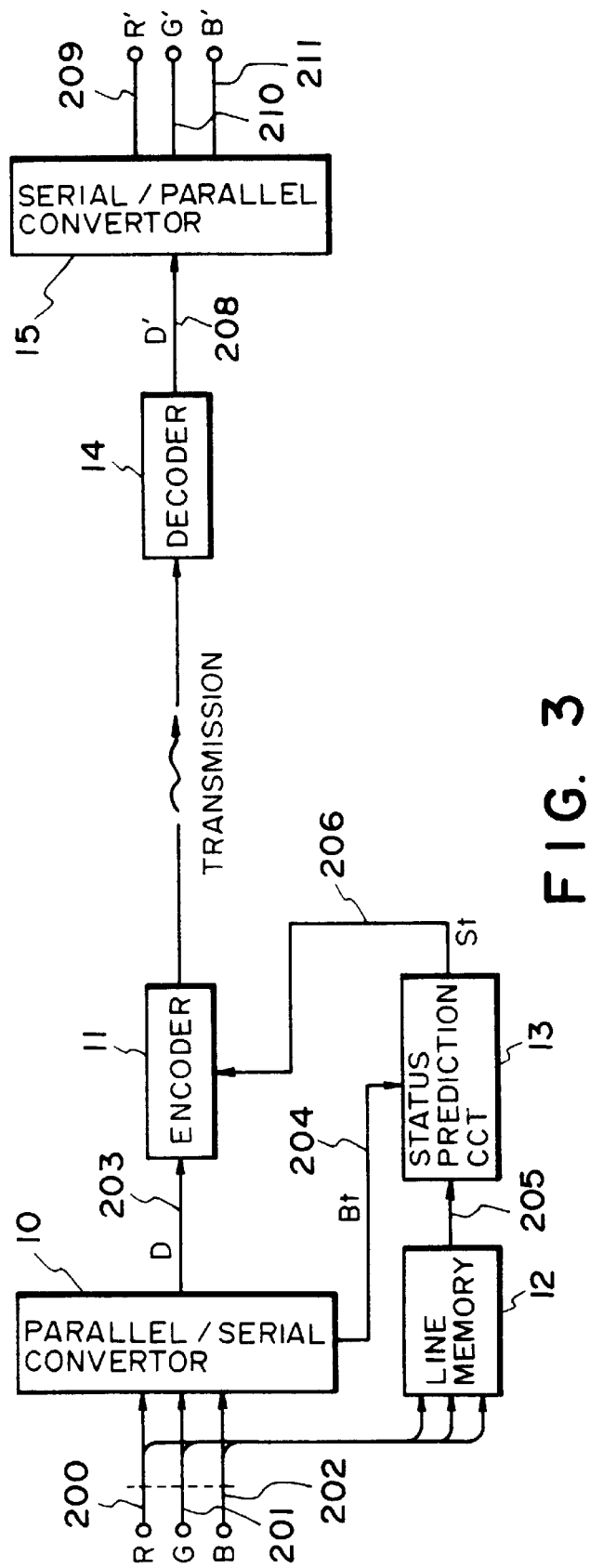

(a) 1ST COLOR 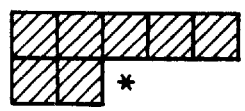 7 PIXELS
(b) 2ND COLOR { 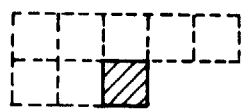 1ST COLOR
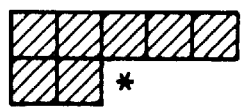 8 PIXELS }
(c) 3RD COLOR { 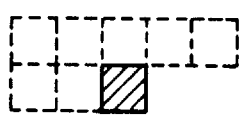 1ST COLOR
 2ND COLOR
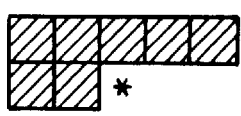 9 PIXELS }
F I G.  7

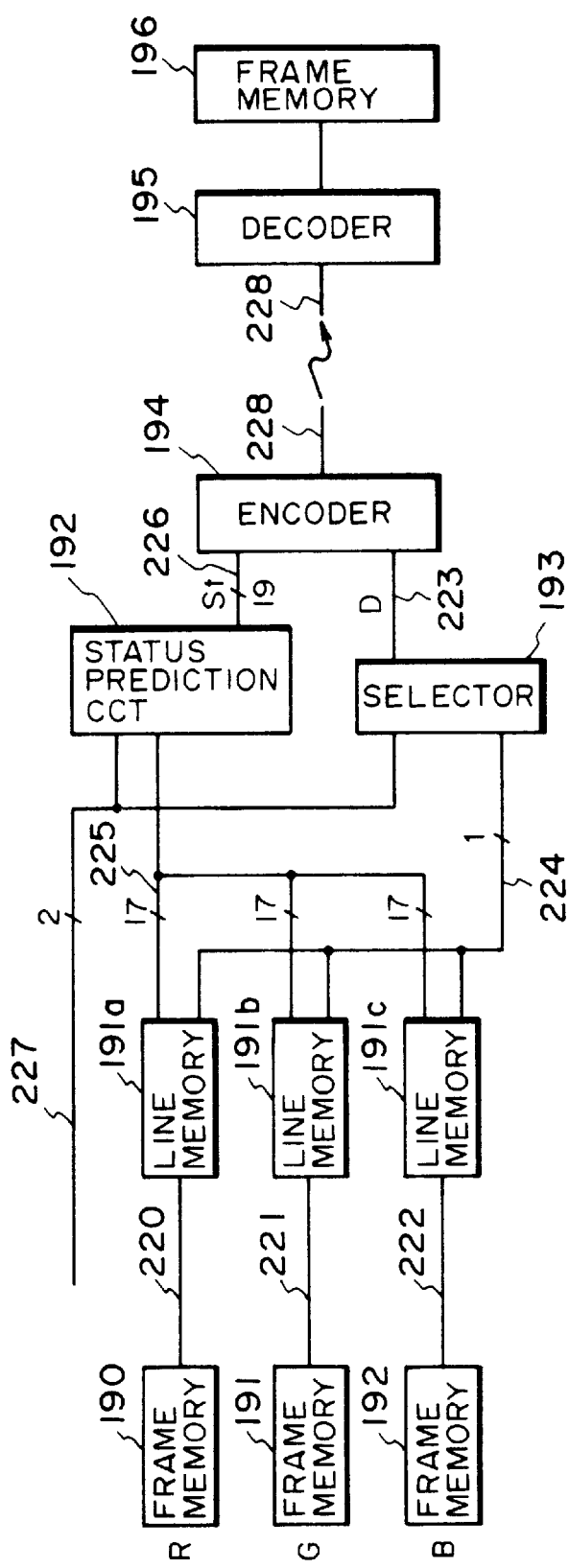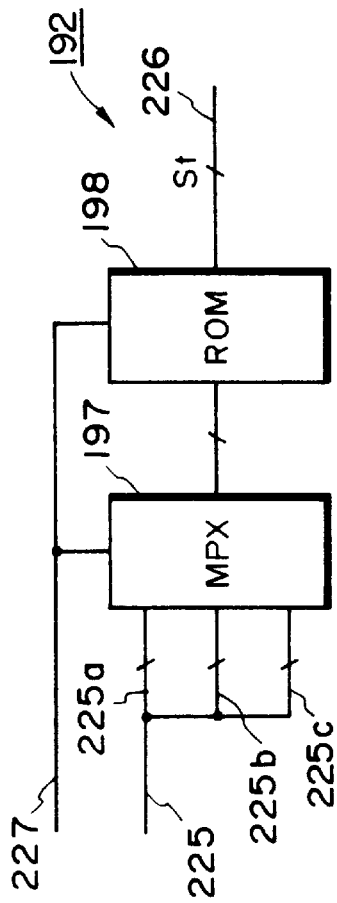
FIG. 11
FIG. 12

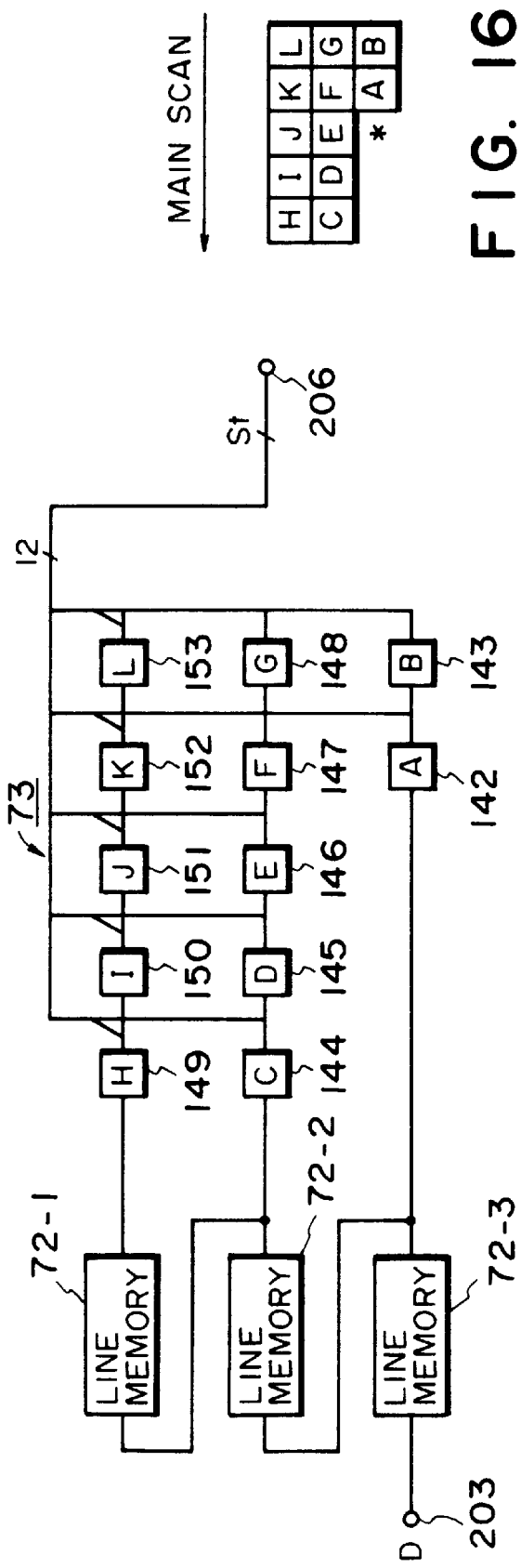
FIG. 15
FIG. 16
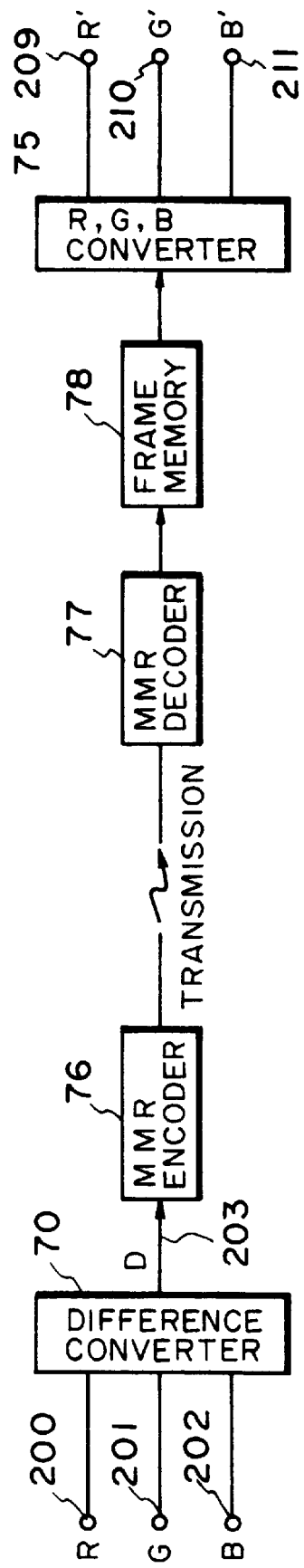
FIG. 17

(a) 1ST SIGNAL 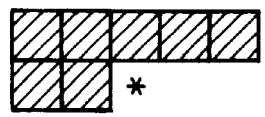 7 PIXELS
(b) 2ND SIGNAL 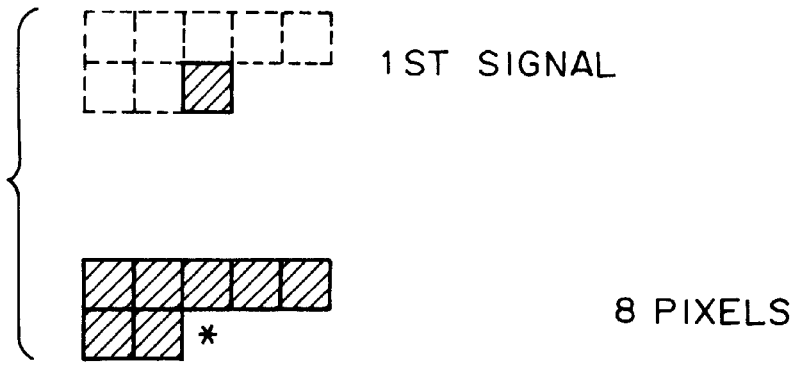
(c) 3RD SIGNAL 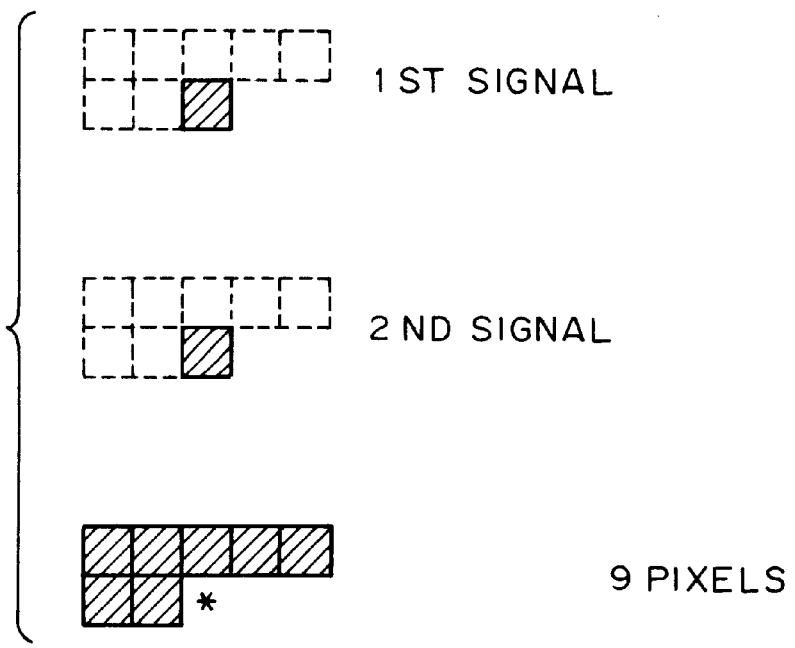
FIG. 19

COLOR IMAGE ENCODING METHOD

This application is a continuation of application Ser. No. 07/577,312 filed Sep. 4, 1990 now abandoned.

BACKGROUND OF THE INVENTION

1. Field of the Invention

The present invention relates to a color image encoding method for a color facsimile etc. for communication of color image.

2. Related Background Art

In the conventional image encoding method, a run length encoding system represented by G3, G4 facsimile recommended by CCITT (Consultative Council of International Telephone and Telegraph) has been generally used. In this encoding system the length of continuation (run length) of white or black pixels is counted and in reference to the predetermined code table, the code corresponding to the counted value is determined. The encoding table used here is so characterized that a relatively short code is allotted to the long white run which often appears in the case of a document image.

On the other hand, low cost color printers have been developed in recent years and an image communication system with binary color having 1 bit data for each of red (R), green (G), blue (B) or yellow (Y), cyan (C) and magenta (M) has been introduced.

One such binary color encoding system, can perform encoding for each of the 3-color bit planes and can use one MH and MR encoding method for black & white picture.

FIG. 1 is an example of the image transmission device to conduct encoding for each 3-color bit plane. In the buffer memories 90-a, b and c are stored, color by color, the R, G and B color signals binarized by a color image reading device not shown in the figure.

First the R signal 300 is input into the encoder 93 from R buffer memory 90-a through selector 98. At the encoder 93, MH and MR codes etc. are encoded and R code 94 is generated. This R code 94 is decoded at decoder 97 and via the selector 99 it is input into R buffer memory 91-a. When encoding of the R signal is over, the G signal 301 is output from G buffer memory 90-b in the same way and then through the similar encoding processing, a G code 95 is generated and, through the similar decoding processing, decoded data are stored in G buffer memory 91-b. In the same way, B code 96 is produced by the B signal coming from B buffer memory 90-c and it is encoded and stored in B buffer memory 91-c.

At printer 92, all data are accumulated in buffer memory 91-a, b and c and thereafter each color data is output and recorded. Or alternatively, it may be so arranged that after accumulating all the data in buffer memory 91-a and 91-b, the B signal is obtained by decoding the B code and is recorded first at printer 92 and then the color data of 91-a and 91-b are recorded.

However, when such a method as to encode each color of a 3-color bit plane, is used the code of each color is independently produced. Therefore, even for a printer which can simultaneously record three colors, such as an ink jet printer, it is necessary that the decoding device is equipped with a buffer memory corresponding to three or two colors.

This method also presents the following drawback: recording can be started only after 3- or 2-color image data are decoded, which includes promptness in data transmission.

Individual encoding of the R, G and B bit planes also increases the entropy of the original R, G, and B data source and, as a result, encoding efficiency deteriorates. To put it in another way, it does not utilize the correlation data of colors.

Another problem is that when the statistical character of the black & white run length of the image is different from that of an image which has been used as the standard when the code table was prepared, for example when a semi-intermediate tone image is transmitted, on-off of color dots is frequently repeated. As a result, the amount of codes may finally exceed the original data.

This method also decreases efficiency because when an image is encoded where black & white images are mixed into color images, R, G and B have the same value. Therefore, even the black & white images which can be expressed in monocolor, must be encoded for each of the R, G and B bit plane.

In other words, with the system to encode color images in 3 bits, when (1) the input manuscript is only in a few colors out of 8 available colors such as white, black and red or white, blue and green, or when (2) the printer at the signal receiving side can express only a few colors out of the eight colors, then the system encodes unnecessary color data and thus data compression becomes insufficient.

SUMMARY OF THE INVENTION

The present invention has been made in light of the above problems and its objective is to provide a color image signal encoding method which can efficiently encode color image signals.

The present invention also provides a color image signal encoding method which transmits color images more efficiently.

The present invention also provides a color image signal encoding method which executes efficient encoding utilizing color correlation.

The present invention also provides a color image signal encoding method which is suitable for encoding color images in several specific colors.

The aforesaid objective and effect and other objectives and effects of the present invention are evident from the following explanation.

BRIEF DESCRIPTION OF THE DRAWINGS

FIG. 2 is a block diagram which represents the concept of the present invention;

FIG. 3 is a block diagram of the transmission system of color images;

FIGS. 7(a) to 7(c) are drawings to show the pixels;

FIG. 11 is the block diagram of an embodiment of the face sequential system;

FIG. 12 is the composition drawing of the status prediction circuit;

FIG. 15 is a block diagram of the status prediction circuit;

FIG. 16 is a drawing to show the reference pixel;

FIG. 17 is a block diagram to show the transmission system to which the MMR encoder is applied;

FIGS. 19(a) to 19(c) are the drawings to show the reference pixels;

DESCRIPTION OF THE PREFERRED EMBODIMENTS

Figure 1:
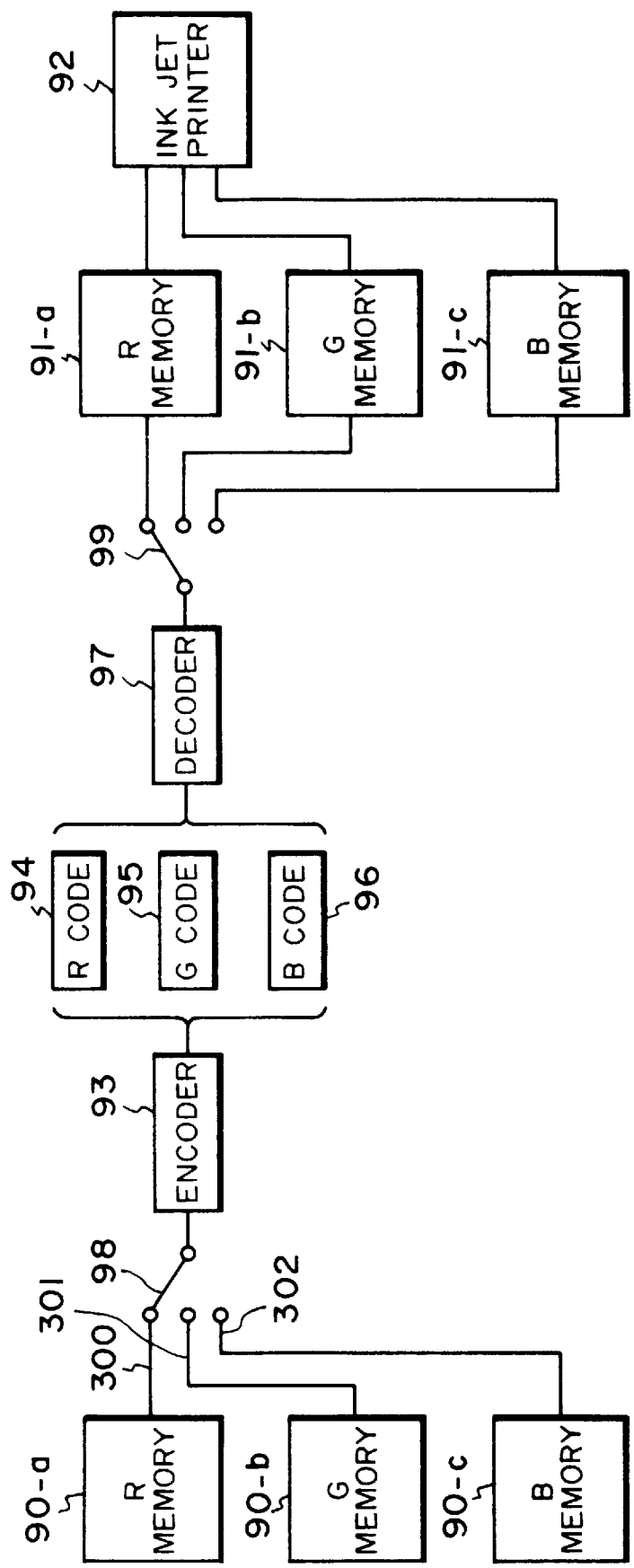
FIG. 1 is the block diagram of a transmission system to execute bit plane encoding.

FIG. 2 is a block diagram to represent the concept of the present invention.

Parallel data 200–202 of 1 bit each of R, G and B which represent each pixel of the color image signal entered at the color image reading unit etc. are converted into the dot sequential serial signal 203 by the order of R, G and B for each pixel, by the parallel/serial converter 10. This order is not limited to the order of R, G and B as long as it is matched at the transmission side and the reception side. For example, it may be by the order of G, B and R.

Serial signal 203 given out at the parallel/serial converter 10 is transmitted to the encoder 11. Here the code 207 for each color is generated based on the encoding condition corresponding to each color and it is transmitted to decoder 12 via a transmission line, memory device, etc.

Decoder 12 decodes the code 207, and the decoded signal 208 in the form of a serial signal RGB is entered into serial/parallel converter 15. The serial signal of RGB is converted by serial/parallel converter 15 into the parallel signals 209, 210 and 211, each having one bit of R, G and B, and the signal is transmitted to the binary color printer 16 of a ink jet printer, etc. Thus, a color image is reproduced and recorded on the recording material.

FIG. 3 is an embodiment of the color image transmission system which embodies the concept shown in FIG. 2.

Input data 200–202 of each 1 bit of R, G and B which represent each pixel of the color image are converted into dot sequential serial signals in the order of RGB for each pixel by a parallel/serial converter 10. Serial signal D203 given out by the parallel/serial converter 10 is transmitted to the encoder 11.

On the other hand, input data 200–202 are stored in the line memory 12 having a capacity of more than one line volume and corresponding to the pixel position to be referred to for status prediction and together with the data of the line several lines before it, it is output at the status prediction circuit 13 for determination of encoding conditions as the output signal 205. At the status prediction circuit 13, the status of each pixel to be encoded is determined by the output signal of line memory 12 and the status signal St206 which indicates the status of encoding is output.

At encoder 11, serial signal D203 is encoded based on status signal St206 by the encoding method to use, for example, arithmetic code, as stated later. Code signal 207 given by encoder 11 is transmitted to decoder 14 via the transmission line.

At decoder 14, decoding is conducted for the received code signal 207 and decoded serial signal D'208 is prepared by the order of RGB for each pixel. This serial signal D' is returned to the binary color data of 1 bit each of R', G' and B' at serial/parallel converter 15 and based on such color data, color image is displayed and recorded.

Explained below is the case when image data are transmitted for each pixel in the order of R, G and B signals (dot sequence).

At the encoding of the R signal which is the first color component signal, and G signal and the B signal of the pixel to be encoded are not known yet and therefore it is undecided whether the color of the pixel is W (white), R (red), G (green), B (blue), Y (yellow), M (magenta), C (cyan) or Bk (black). In other words, when encoding is done color by color, at the time of encoding of the first color, the status of any other colors is unknown.

On the other hand, at the encoding of the G signal, which is the second color component signal, if reference is made to the R data of the same pixel already encoded, the color of the pixel to be encoded is known to be in either the (W, R, Y, M) group (when R=1) or the (Bk, G, B, C) group (when R=0) and it becomes easier to predict the value of G.

If binary data R, G of the same pixel already encoded is referred to at the encoding of the third signal or B signal, the color of the pixel is known to be either one of the four groups, namely, the (W, Y) group (when R=G=1), the (R, M) group (R=1, G=0), the (G, C) group (G=0, G=0) or the (Bk, B) group (R=G=0) and thus prediction of the value of B becomes even easier. As shown above, by adding color data to the data obtained from spatial correlation, the rate of agreement of prediction increases and encoding efficiency improves. According to the present embodiment, optimum encoding can be executed for various kinds of images through the employment of a color image encoding system in which encoding is done in adaptation to the image signal as stated later.

Figure 6:
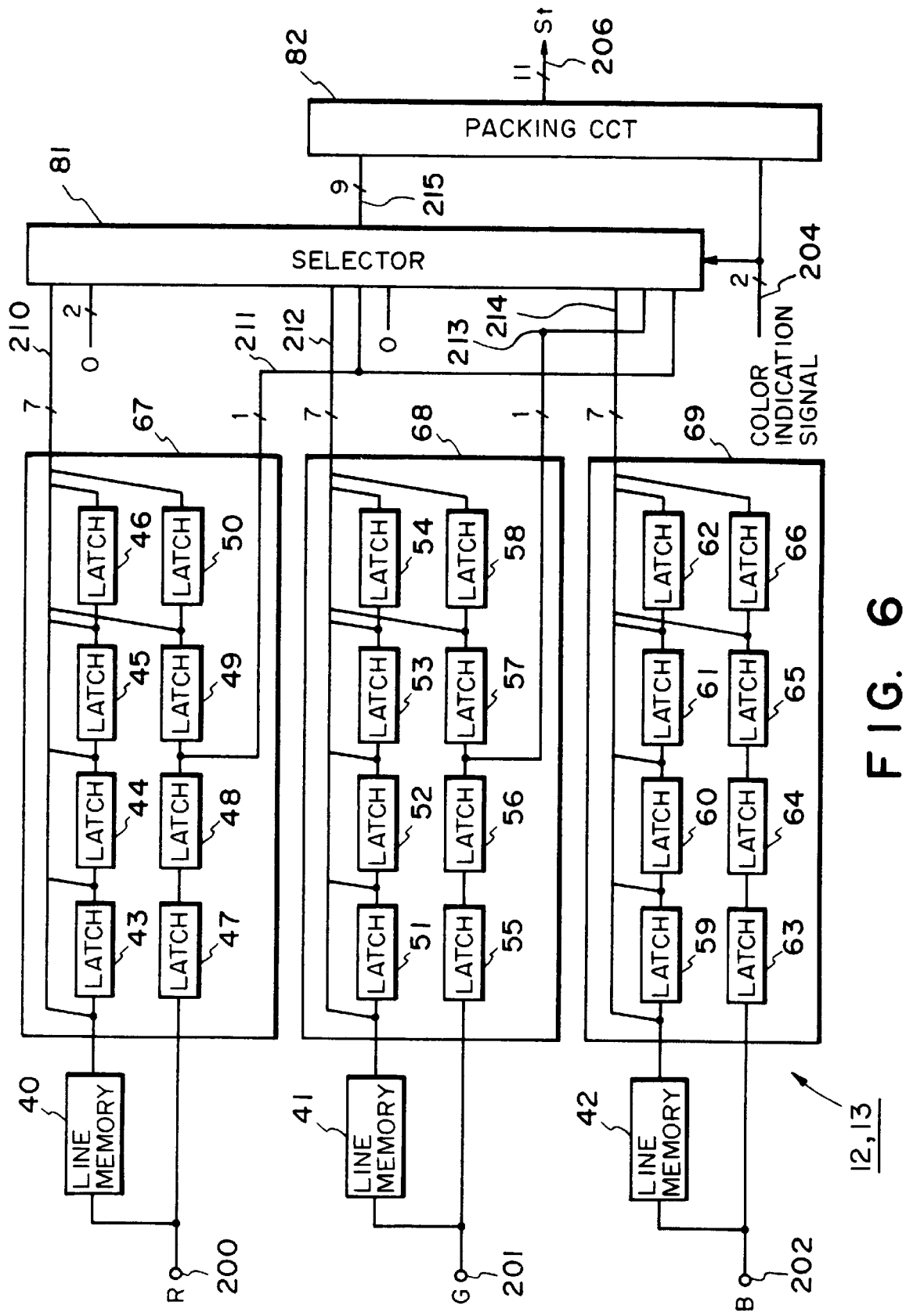
FIG. 6 is a block diagram of the status prediction circuit.

FIG. 6 is the circuit block diagram to indicate the composition of line memory 12 and the status prediction circuit 13 shown in FIG. 3, while FIG. 7 shows the position of pixels classified by color which is referred to for prediction of the status.

FIG. 7(a) indicates the reference pixel of the first color shade to be encoded (R in the case of the present embodiment) and it shows that reference is made to 7 pixels already encoded around the pixel to be encoded which is indicated by *.

FIG. 7(b) indicates the reference pixels of the second color shade already encoded (G in the case of the present embodiment) and shows that reference is made to 8 pixels, namely, the same 7 pixels as those of 7(a) and the pixel itself for the first color.

FIG. 7(c) indicates the reference pixels of the third color (B in the case of the present embodiment) and shows that reference is made to 9 pixels, namely, the same 7 pixel as those of 7(a) and the pixel at the same position of the first color and the second color.

As stated above, in the present embodiment, it is so arranged that encoding conditions are more properly set by utilizing the correlation between colors for each color of the same pixel.

In the composition shown in FIG. 6, the status of each color is determined by referring to the plural number of pixels at reference pixel position of each color shown in FIGS. 7(a)–7(c). Hereunder is explained the performance of FIG. 6.

RGB data 200–202 are input into the latch groups 67–69 and at the same time into line memories 40, 41 and 42 which and line memories 40–42 hold the RGB data delayed by one line. Latches 43–50, latches 51–58 and latches 59–66 hold the data delayed by every one pixel clock.

At latch group 67, by the output of line memory 40 and that of the latches 43, 44, 45 and 46 to which the output of line memory 40 is input, the data of 5 pixels on the line preceding the line to be encoded are made available for reference. By the output of latches 49 and 50, two pixels already encoded on the encoding line are made available for reference. The data of these 7 pixels are combined and are made to be the reference pixel signal 210 used for determination of the status of R which is the 1st color to be encoded. Latch 48 outputs the data 211 of R of encoded data for determination of the status of other colors G and B.

Latch groups 68 and 69 having the same composition as that of latch group 67 are provided for data G201 and B202 and these latch groups 68 and 69 output the data of 7 pixels same as those of latch 67 as reference pixel signals 212 and 214.

Latch 56 in the latch group 68 outputs the data 213 of encoded pixel G for determination of the status of B.

Color indication 2-bit signal 204 which indicates the color corresponding to the output of color data of RGB given out by parallel/serial converter is input into selector 81. Selector 81 changes over the reference pixel signal according to such color indication signal 204. That is, when color indication signal 204 is R, the selector selects the reference pixel signal 210 and 2 bit of zero signal. When the color indication signal 204 is G, it selects reference pixel signal 212, R signal 211 and 1 bit of zero signal. When 204 is B, it selects reference pixel signal 214, R signal 211 and G signal 213. These 9-bit selection signal 215 and 2-bit color indication signal 204 are combined into 11-bit signal by the packing circuit 82 to become the status signal St206. Therefore the status signal St206 indicates the color of the pixel to be encoded and the status of the surrounding and indicates $2^7$, $2^8$ and $2^9$ kinds of status for each color of R, G and B.

Figure 4:
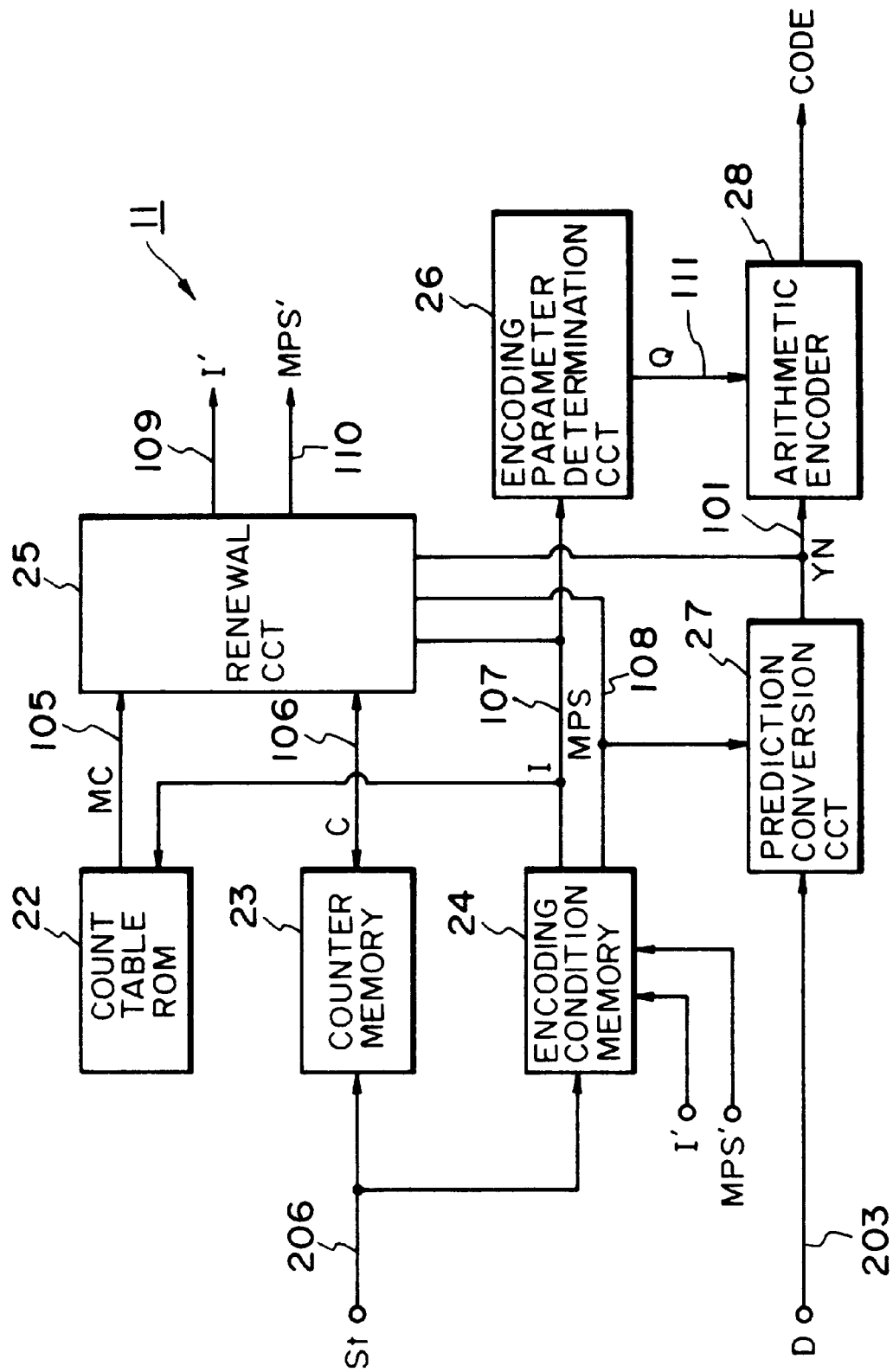
FIG. 4 is a block diagram of the encoder.

FIG. 4 is the block diagram of encoder 11 shown by FIG. 3.

Before going into the explanation of FIG. 4, explanation shall be made on arithmetic code used in the present embodiment.

As having been known since before, arithmetic encoding is the method to form the code by an arithmetic operation in such way that the input signal series shall become the code expressed by decimal binary number. This method has been published in the literature by Langdon and Rissanen et al entitled "Compression of Black/White Images with Arithmetic Coding" IEEE Tran Com. COM-29, 6, (1981.6) etc. According to this literature, when already encoded input signal series S is represented by S, the probability at which the less probable symbol (LPS) is given is represented by q, operation register Augend is represented by A(S) and code register is represented by C(S), the following arithmetic operation is executed for each input signal:

$$A(S1)=A(S)\times q \approx A(S)\times 2^{-Q} \tag{1}$$

$$A(S0)=<A(S)-A(S1)>l \tag{2}$$

< > l indicates rounding at l bit of effective digits $$C(S0)=C(S) \tag{3}$$

$$C(S1)=C(S)+A(S0) \tag{4}$$

Here, when encoded data are the most probable symbol (MPS: 0 in the above case), A(S0) and C(S0) are used for encoding of the succeeding data. When the encoded data are the less probable symbol (LPS: 1 in the above case), A(S1) and C(S1) are used for encoding of the succeeding data.

The new A value is multiplied by $2^S$ (S is an integral number larger than 0) and set in between $0.5 \leq A < 1.0$. This processing corresponds to S times of shifting of operation register A in regard to hardware. The same number of shifting is made for code register C and the signal shifted out becomes the code. Code formation is made by repeating the above processing.

As shown in the equation (1) by approximating the appearance probability q of LPS by the power of 2 ($2^{-Q}$: Q is the positive integral number), multiplication is replaced by shift operation. To improve this approximation, q is approximated by the polynomial expression of the power of 2 as shown in equation (5). By such approximation, the worst point of efficiency is improved.

$$q \approx 2^{-Q_1}+2^{-Q_2} \tag{5}$$

As for arithmetic code, the value of Q may be changed for each encoded data and therefore the probability estimation section can be separated from encoding.

In the present embodiment, a dynamic method to estimate the probability while conducting encoding is employed as stated above.

Next, explanation shall be made of the block diagram of encoder 11 of FIG. 4 which executes arithmetic encoding.

Status signal St206 coming from status prediction circuit 13 is input into the counter-memory 23 and encoding conditions memory 24.

The encoding conditions memory 24 memorizes the more probable symbol MPS108, which is the symbol more probably given and index 1107 which indicates the encoding conditions containing the appearance probability of LPS of arithmetic code to be stated later, for each of $2^7$, $2^8$ and $2^9$ kinds of status of each color of R, G and B. MPS108 read out of encoding condition memory 24 according to the color and status of the image to be encoded is input into prediction converting circuit 27 while the prediction converting circuit 27 produces YN signal 101 which becomes zero when serial signal D203 agrees with MPS108. YN signal 101 is input into renewal circuit 25 and at the renewal circuit 25, when YN signal is 0, the count of the status corresponding to the count value memorized in counter memory 23 is incremented. When the count value C106 memorized in the counter memory 23 agrees with the set value MC105 coming from count-table ROM22, renewal is made in the direction where index 1107 becomes larger (in the direction where appearance probability q of LPS becomes smaller). (Inversion of MPS is not executed.)

Count table ROM22 supplies the renewal circuit 25 with MC105, the number of MPS indicated in Table 1 which is determined in correspondence to index 1 expressed by appearance probability q of LPS.

At the renewal circuit 25, when MPS108 does not agree with pixel signal 203, i.e., when YN signal from prediction conversion circuit 27 is 1, renewal is made in the direction where index 1107 becomes smaller (in the direction where appearance probability q of LPS becomes larger). If YN signal with value 1 is given when index is 1, processing is made to invert MPS (0→1 or 1→0). Output I' 109 and MPS' 110 of renewal circuit 25 are the values of index after renewal and they are re-memorized in the encoding condition memory 24.

At the encoding parameter determination circuit 26, encoding parameter Q111 of arithmetic code is set on the arithmetic encoder 28 based on the value of index 1107. At this arithmetic encoder 28, YN signal 101 coming from prediction conversion circuit 27 is made into arithmetic code using parameter Q111 to obtain the code 102.

By providing initial value to the encoding condition memory 24 and not renewing MPS, static encoding is easily realized.

Figure 5:
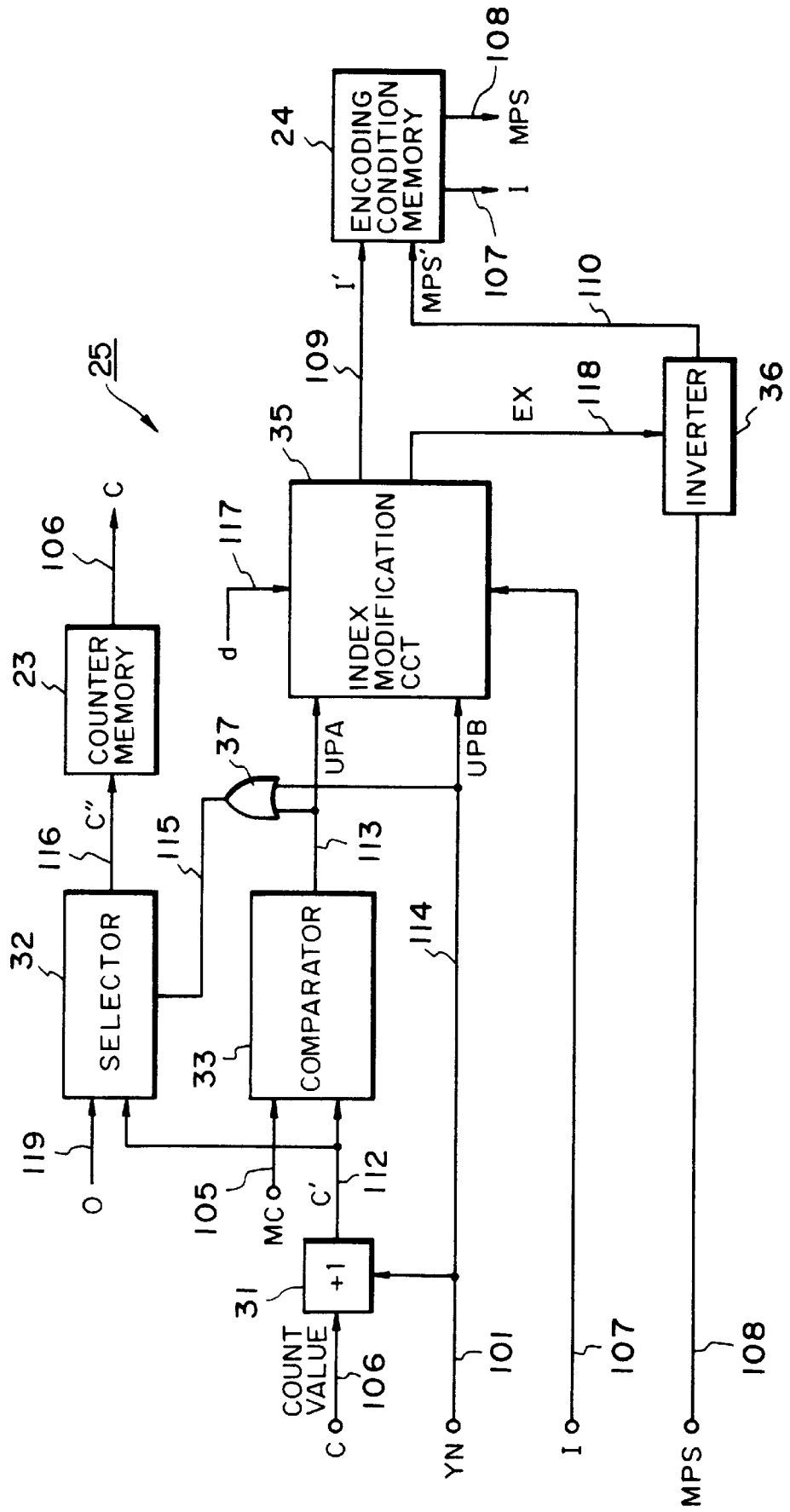
FIG. 5 is a block diagram of the renewal circuit.
Figures 9, 10:
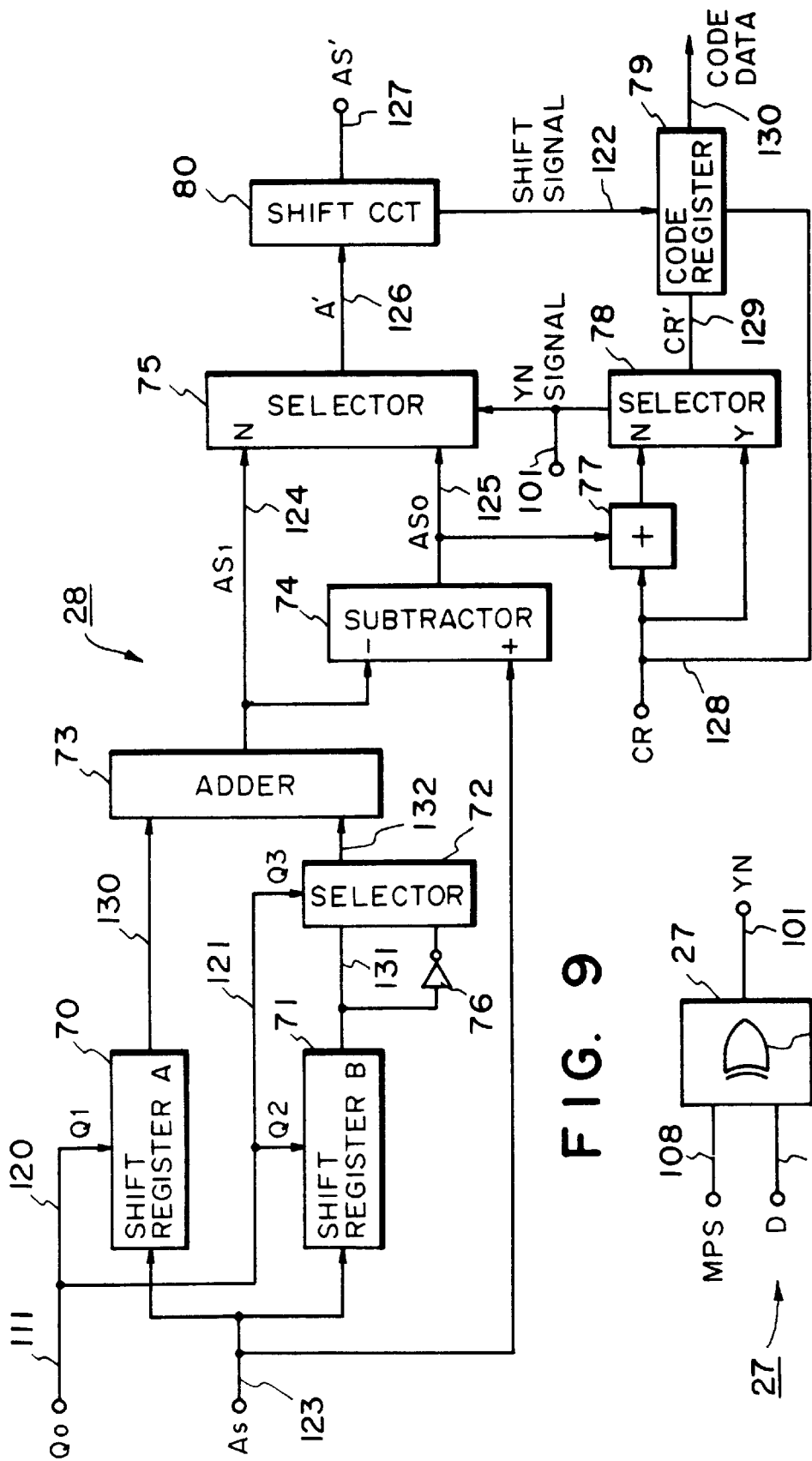
FIG. 9 is a block diagram of the arithmetic encoder.
FIG. 10 is a block diagram of the prediction conversion circuit.

FIG. 10 is the block diagram of prediction conversion circuit 27. Serial signals D203 and MPS108 are input into the EX-OR circuit 29 and according to the logical formula of Table 2, YN signal 101 which becomes 0 when serial signal D203 agrees with MPS108 and becomes 1 when they disagree. FIG. 5 is the block diagram of renewal circuit 25. When YN signal 101 is 0, count value C106 coming from counter memory 23 is incremented by +1 by the adder 31 to become the signal C'112.

This value is compared with MC105 coming from count table ROM22 at comparator 33 and when the value of C' agrees with the value of MC, renewal signal UPA113 is set at 1. YN signal 101 becomes the renewal signal UPB114 while UPA and UPB enter the index modification circuit 35. Logic OR is taken for UPA and UPB at OR circuit 37 and output signal 115 of OR circuit 37 becomes the changeover signal of selector 32. At selector 32, when the signal 115 is 1, it selects 0 signals 119 to reset the value of counter memory 23 and at other times, it selects output signal C' 112 of adder 31 and it is output as the counter renewal signal C" 116 and counter memory 23 memorizes it. Therefore, when serial signal D203 does not agree with MPS108 and when the agreement status continues for preset times, the count value of counter memory 23 is reset.

At the index modification circuit 35 the present index 1107 is input by the signal d117 (d=1 in standard case) which controls the renewal pitch of the index, UPA113, UPB114 and encoding condition memory 24.

Table 3 indicates the method of renewal of the index at the index modification circuit 35 (Table 3 represents the cases when renewal pitch is d=1 and d=2). By referring to this table for the present index I, renewal pitch condition d, UPA and UPB, the renewed index I' is determined. When I=1 and UPB=1 (when serial signal D203 disagrees with MPS108), EX signal 118 is set at 1. When EX signal 118 is 1, the symbol of the present MPS108 is inverted (0→1 or 1→0) to obtain the renewal MPS' 110. When EX signal 118 is 0, MPS' is not modified. Thus renewed I' 109 and MPS' 110 are memorized in encoding condition memory 24 and they are used as the index I and MPS for the succeeding processing. The method of renewal shown in Table 3 may be composed of the table by using ROM etc. or of logics using adder-subtractor.

As aforesaid, when MPS for the amount corresponding to the number of MPS determined by the value of index I, which expresses the appearance probability q of LPS approximated by polynomial of the power of 2, index I is d-added, to reduce the appearance probability q of LPS used as arithmetic code, while when LPS is generated, index I is d-subtracted to enlarge the appearance probability q of LPS used for arithmetic code. When LPS generates under the status where appearance probability q of LPS represents 0.5 (the status where index I is 1), MPS is inverted.

As aforesaid, by renewing index I and MPS in adaptation to the input image, arithmetic encoding with excellent encoding efficiency is realized.

Figure 8:
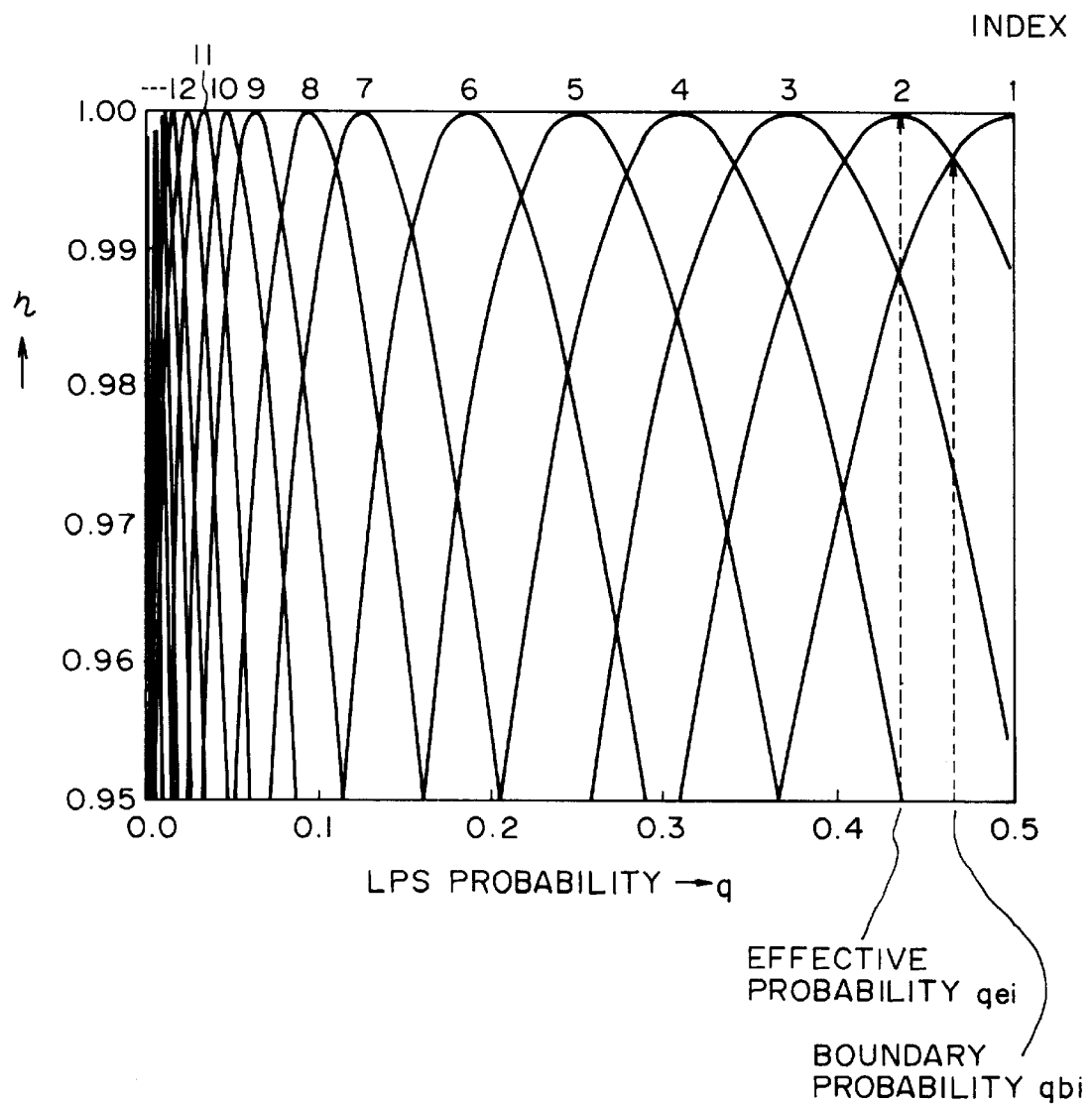
FIG. 8 is a drawing to show the encoding efficiency curve.

FIG. 8 shows the encoding efficiency curve of arithmetic code used in the present embodiment. Hereafter, the value of index I is shown by small letter i. The said curve is represented by the formula (6) when the appearance probability of LPS is represented by q and approximation probability at encoding time is represented by $q_{ei}$. Index I is sequentially given from 1, 2, 3 . . . from the side where appearance probability q of LPS is larger toward the side where it is smaller.

$$\eta = \frac{-q\log_2 q - (1-q)\log_2(1-q)}{-q\log_2 q_{ei} - (1-q)\log_2(1-q_{ei})} \quad (6)$$

Here the molecule is entropy and $q_{ei}$ is the value represented by equation (7), $$q_{ei} = q_1 + q_2 \quad (7)$$

The values of $q_1$ and $q_2$ are the polynomial approximation values of the power of 2 and they are given by Table 4. For examples they are shown by (8)–(10) below, $$q_{e1}' = 2^{-1} \quad (8)$$

$$q_{e2}' = 2^{-1} - 2^{-4} \quad (9)$$

$$q_{e3}' = 2^{-2} + 2^{-3} \quad (10)$$

The peak point $q_{ei}$ where efficiency η becomes 1.0 at this probability shall be called hereafter effective probability. The cross of the efficiency curves is called boundary probability $q_{bi}$ and it is evident that beyond this probability, the efficiency is better if encoding is executed using the adjacent effective probability.

In the present example of practice, effective probability $q_{ei}$ shown in Table 4 is selected from the probabilities which may be approximated by two terms as shown in equation (5). $Q_1$, $Q_2$ and $Q_3$ of Table 4 are the parameters $Q_c$111 to be transmitted to arithmetic encoder 18. That is, $Q_1$ and $Q_2$ represent the shift volume to be given to the shift register. By such shift operations a power of 2 calculation is performed. $Q_3$ shows the coefficient at the second term and it makes the +, − changeover.

The value of MC in Table 1 is determined in the following way.

When the number of LPS is $N_L$ and the number of MPS is $N_M$, probability of generation of LPS is given by equation (11).

$$q = \frac{N_L}{N_M + N_L} \quad (11)$$

When this equation is solved by $N_M$, equation (12) is given.

$$N_M = [N_L(1/q - 1)] \quad (12)$$

Here, [x] expresses the raising of the numbers below the decimal point. By substituting q in equation (12) by $q_{bi}$ shown in FIG. 8, the number $N_{Mi}$ of more probable symbol (MPS) is calculated. Therefore MC can be calculated from equation (13).

$$MCi = N_{Mi+1} - N_{Mi} \quad (13)$$

The values of MC in Table 1 have been calculated from equations (11), (12) and (13) assuming $M_L = 2$.

As aforesaid, the number $N_{Mi}$ of the more probable symbol MPS corresponding to each index I is obtained based on each boundary probability $q_{bi}$ shown in FIG. 8 and the difference in the more probable symbol $N_M$ between the adjacent indices is deemed to be the MC for the respective index I.

The value of MC is compared with the number of more probable symbol MPS generated as aforesaid and if the value of MC agrees with the number of continuous generation of more probable symbol MPS, it is judged to be the status where encoding by the adjacent index I is suitable and index I is modified. Thus index I is modified by good timing based on the number of generation of more probable symbol MPS which results in encoding by the optimum index I with good adaptation.

FIG. 9 is the block diagram of arithmetic encoder 28. Out of the control signal Q111 (Table 4) determined by code parameter determination circuit 26, $Q_1$ is entered into the shift register A70, $Q_2$ is entered into the shift register B71 and $Q_3$ is entered into the selector 72. $Q_1$ and $Q_2$ indicate for how many bits the Augend signal $A_s$123 should be shifted to the right as against the shift registers A and B. The results of such shift are represented by output signals 130 and 131.

Inverter 76 provides the complement of signal 131 and selector 72 selects the output signal of signal 131 or inverter 76 by control signal $Q_3$ to obtain the output signal 132. At the adder 73, signal 130 coming from shift register A70 and signal 132 from selector 72 are added and $A_s{}^1$ signal 124 is given out. At the subtractor 74, $A_s{}^1$ signal 124 is subtracted from $A_s$ signal 123 to obtain $A_{s0}$ signal 125. At selector 75, either $A_{s0}$ signal 125 or $A_{s1}$ signal 124 is selected according to YN signal 101. That is, when the YN signal is 1, the $A_s{}^0$ signal is selected and when the YN signal is 0, the $A_s{}^1$ signal becomes A' signal 126. At shift circuit 80, leftward shift processing is continued until MSB of A' signal 126 becomes 1 and by such shift, $A_s{}'$ signal 127 is obtained. Shift signal 122 corresponding to the frequency of such shift enters into the code register 79 and from code register 79, the number of bits corresponding to the shift frequency are output one after another at MSB to produce the code data 130.

Code data 130 are so processed by the bit processing method not indicated in the figure that the continuation of bit 1 shall be allowed up to a certain limit and they are transmitted to decoder 14 side.

Content CR128 of code register 79 is added to $A_s{}^0$ signal 125 at the adder 77 and enters into selector 78. Signal CR128 to which no $A_s{}^0$ signal 125 has been added also enters into the selector 78 and it is output as CR' signal 129 which equals to CR when YN signal 101 is 1 and equals to CR+$A_s{}^0$ when YN signal is zero. The shift processing stated above in regard to code register 79 is the processing done for CR' signal.

As aforesaid, according to the present embodiment, at the prediction encoding of color image signal expressed by plural number of color component signals, prediction is so made that the rate of agreement of prediction and encoding efficiency are improved by referring to the surrounding pixels of the same color and referring to the pixels of other colors having been encoded already.

In the present embodiment, input/output composition by dot sequence is employed and therefore, this system is particularly effective for the cases where the data are output to the printer which performs printing in the order of RGB after decoding just like the case of ink jet printer.

Explanation has been made in the above on encoding of 3-bit color signals of R, G and B but it may be easily expanded to 3-bit color signals of Y, M and C or to 4-bit color signals of Y, M, C and Bk.

It goes without saying that this method may be applied not only to the transmission of color image signals such as color facsimile but also to encoding of color image signals for storage for electronic file systems, etc.

As explained above, by encoding a plural number of color component signals by dot sequence and making them into single data, it is possible to simplify the composition of encoding and decoding devices, speed up the reproduction of color images and thus efficiently encode the color image signals which are expressed with plural number of color component signals.

The embodiments explained above are those applied to the color signals input and output by the order of RGB (dot sequence) for each pixel. A similar prediction, however, is also possible for the signals input and output by the order of RGB for each pixel.

In the present embodiment, by processing the color image data for each color plane, it is now possible to select the pixel at an arbitrary position of the preceding color plane which has been already encoded as the reference pixel at the time of encoding of the pixels of the second plane and so on.

It is also possible in the present embodiment to utilize the correlation of colors on the same color plane by referring to the past pixel on the same plane (the pixel preceding the pixel under attention for encoding which exists on the same color planes i.e., the pixel at the position already encoded on the color plane on which the pixel under attention exists) as the reference pixel at the time of encoding.

Further, by referring to the future pixel on the preceding color plane (the pixel at the later position than the pixel under attention i.e., the pixel at the position uncoded yet on the same color plane with that of the pixel under attention) it has been made possible to catch the stronger color correlation.

Further aspects of the present embodiment are described below.

Figure 13:
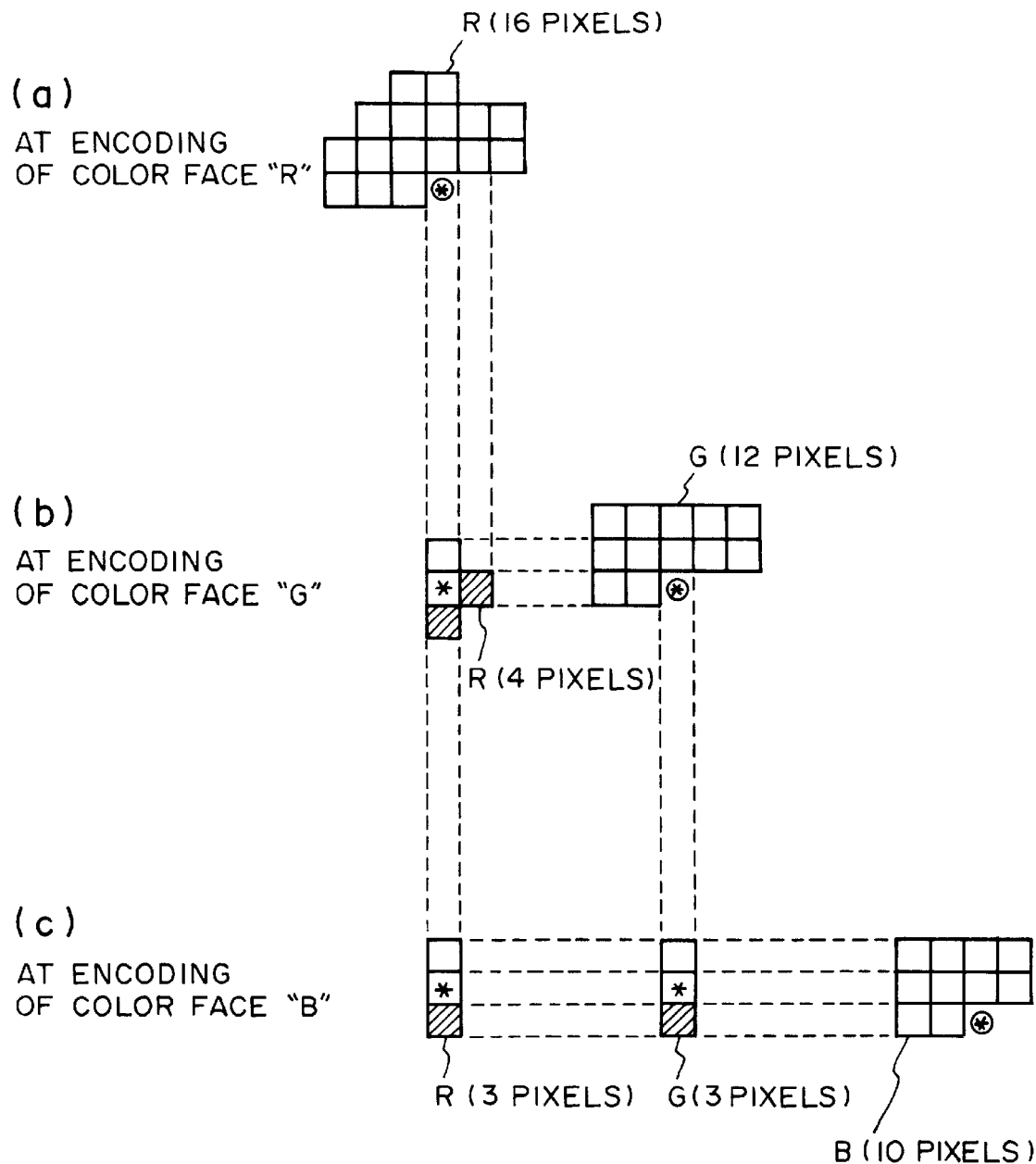
FIGS. 13(a) to 13(c) are the drawings to show the reference pixels of the face sequential system.

FIG. 13 shows the example of picking up the reference pixel in the present embodiment. FIG. 13(a) shows the reference pixel at the time of encoding of the R plane. The mark * in the figure shows the pixel to be encoded and 16 pixels around it are referred to. FIG. 13(b) is the case of encoding of plane G. At the time of encoding of plane G, 4 pixels on the R plane and 12 pixels on the G plane are referred to. In the figure, * shows the other color data of the pixel to be encoded, while the diagonal line pixel indicates the future pixel when viewed from the pixel to be encoded. Likewise, FIG. 13(c) shows the case of encoding of the B plane wherein 3 pixels on the R plane, 3 pixels on the G plane and 10 pixels on the B plane are referred to. The method of picking up of a reference pixel is not limited to this example alone but more pixels may be referred to and position may also be freely selected.

The reason why the G plane and the B plane were not referred to in the case when, for example, encoding of the R plane is conducted at first is because the circumstances at the time of decoding are taken into account. In other words, in the present embodiment, transmission and decoding are conducted in plane sequence and therefore the data of G plane and B plane which must be referred to at decoding of R plane are not transmitted yet and consequently decoding is impossible.

FIG. 11 is the block diagram to show the composition of color image transmission system of the present embodiment. In FIG. 11, 190–192 are the frame memory to store the binary image data of the picture plane of R, G and B respectively. Frame memory 190–192 outputs the pixel data of R, G, B as a parallel signal 220–222.

Parallel data 220–222 of each one bit of R, G and B which express each pixel of color image are held in the line memory 191a–191c, which has the capacity to accommodate data of several lines (in the case of the present embodiment, 4 lines) and together with the data of the line several lines preceding thereto, they are delayed and output at the status prediction circuit 192 as a 17-bit output signal 225. This line memory may be constructed in the same form as that of the first embodiment according to the pixel which has been picked up for reference. Status prediction circuit 192 investigates the status of the pixel presently under consideration according to the signal 225 from line memory and color indication signal 227 indicating the color plane being processed and outputs the status signal St226 at the encoder 194.

On the other hand, line memory 191a–191c output each 1-bit RGB data of the position of the pixel under attention for encoding at the selector 190 in the form of output signal 224. Upon receipt thereof, selector 193 transmits the 1-bit data of the position and the color under attention to encoder 194 as signal D223. At the encoder 194, code 228 is prepared by the encoding method to use, for example, arithmetic code such as Markov code based on the pixel signal 223 and status signal St226 as stated above and through the transmission route, it is transmitted to decoder 195. At decoder 195, the code 228 is decoded and the result of such decoding are entered into the frame memory 196.

FIG. 12 is the block diagram of status prediction circuit 192. The reference pixel used here for determination of prediction status in this embodiment is shown in FIG. 13. In FIG. 12, pixel signal 225 (17 bits) for 3 colors around the position of pixel under attention having been subtracted from the line memories 191a–191c of each plane R, G and B are output at multiplexer 197 together with 2-bit color indicating signal 227 which shows the plane being processed. Multiplexer 197 selects the reference pixel of the shape shown in FIG. 13 according to the color indicating signal 227 and enters them into ROM 198 together with color indicating signal 227. ROM 198 generates the status code for the input status and outputs it as the status signal St226.

In the present embodiments encoding of 3-bit color signal of R, G, B or Y, M, C has been explained but at the color printer, it may be easily applied to 4-bit color signal of Y, M, C and Bk.

It may, of course, be applied to the color signal wherein each color has more than 2 bits.

It may also be applied not only to the transmission of color image signals of color facsimile etc. but also to encoding of the color image signals for storage of electronic filing systems etc.

As explained above, according to the present embodiment, at plane-sequential encoding of a color image, it is possible to eliminate the drawbacks of the conventional run length encoding by using prediction encoding and further to suppress the increase of entropy by referring to other color planes having already been encoded at the prediction encoding and to catch the stronger color correlation by referring to the future pixel of other color planes, such correlation being made possible by plane-sequential processing. In other words, the method of the present invention makes it possible to improve the encoding efficiency.

Especially in the present embodiment, encoding is conducted by the order of RGB for each color pixel and therefore the range of other color pixel to be referred to is widened and thus it provides such effect that the value of YN signal 101 of prediction exchange circuit of FIG. 3 is further optimized and encoding efficiency is substantially improved.

The present embodiment is effective also in the case when printing is made by an electronic photographic device or a thermal transcription printer which prints out decoded data plane-sequentially.

As explained above, by referring to other color signals at the encoding of binary color signal, efficient encoding can be made utilizing the color correlation, increase of the amount of data that is suppressed. Also, by encoding the data by classifying the predicted status it has become possible to encode the binary color image efficiently.

In the embodiment explained above, the input R, G, B signals of one bit each are encoded by dot-sequence or by plane-sequence. However at least two of the RGB signals which express black and white image often have the same value and therefore it is possible to improve encoding efficiency utilizing such characteristics.

Below is explained the high efficiency encoding to use the correlation of R, G and B.

Figure 14:
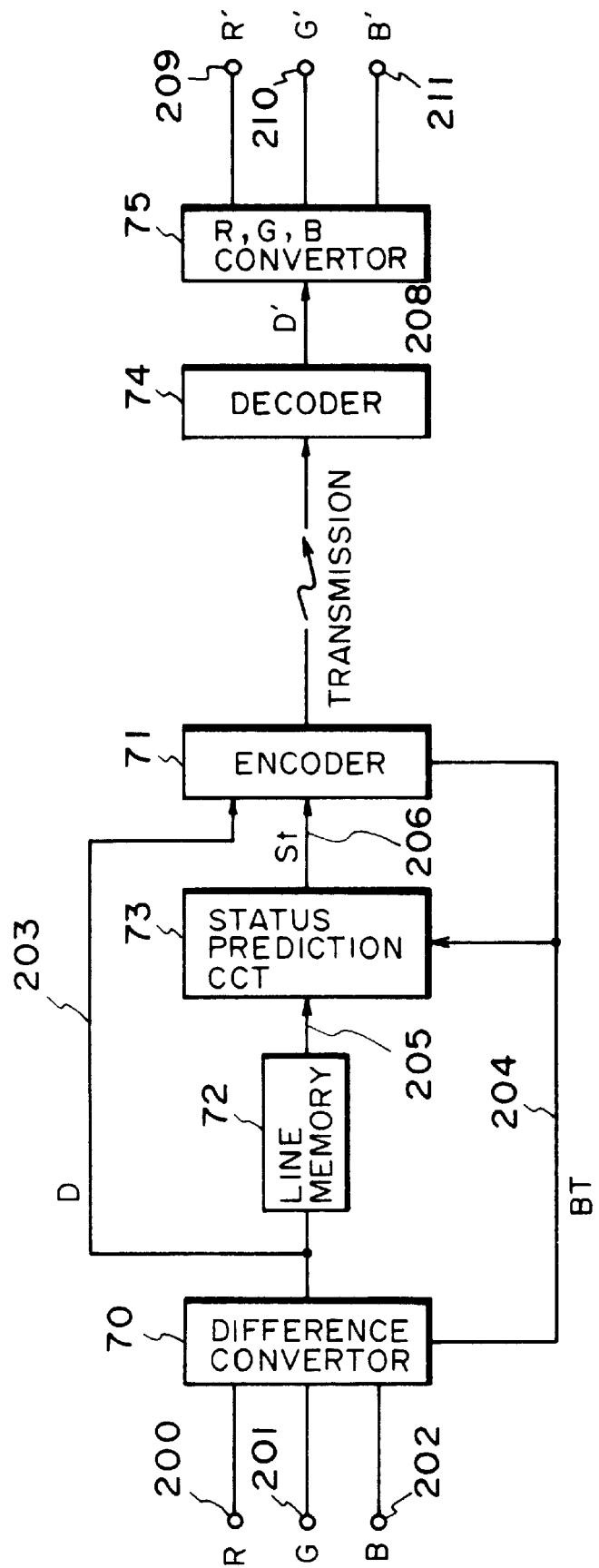
FIG. 14 is a block diagram of a transmission system of color image to which color correlation has been applied.

FIG. 14 is the block diagram to show the embodiment of the color image transmission system to which the aforesaid concept is applied.

The parts common with those of FIG. 2 etc. are given the common numbers. One bit each input data 201, 202 and 203 of R, G, B which express each pixel of color image is converted into the pixel signals $D_2$, $D_1$ and $D_3$ which are respectively composed of three differential data for each pixel by difference converter 70 as shown by the following formula.

$$D_1 = G$$

$$D_2 = |G - R|$$

$$D_3 = |G - B|$$

This means that the pixel signal $D_1$ is the G data itself while pixel signals $D_2$ and $D_3$ are respectively 1 if the R data and the B data are different from the G data and 0 if they are same. The converted pixel signals $D_1$, $D_2$ and $D_3$ are plane-sequential in this order and they are encoded, for example, by using the aforesaid arithmetic code.

For encoding of the first plane G data 200 are output as it is from difference converter 70 as pixel signal $D_1$ and entered into line memory 72 and encoder 71 to be encoded. After completion of encoding of the first plane i.e., pixel signal $D_1$, the pixel signals $D_2$ and $D_3$ of the second and third planes transmitted from difference converter 70 are plane sequentially encoded.

Pixel signals $D_2$ and $D_3$ of the second and third planes that are encoded after encoding the bit plane of pixel signal $D_1$ of the first plane (G data) are binary data to show the difference between G data and R and B data respectively and therefore when the image has a strong color correlation, the value of pixel signals $D_2$ and $D_3$ of the second and third planes often indicate zero and therefore the amount of coding of such image is rather small. For black and white images, R, G and B become the same signal and consequently the encoding amount of bit plane of pixel signals $D_2$ and $D_3$ are practically none. Therefore, this system is particularly useful for color images etc. which contains black and white images.

On the other hand line memory 72 has the capacity to accommodate the data of a plural number of lines and the status of the pixels surrounding the pixel to be encoded are output to status prediction circuit 72 as output signal 205.

As status prediction circuit 73, signal 205 coming from the line memory 72 and the bit plane to be encoded determine the encoding status of each pixel to be encoded by Bt signal 204 which indicates either one of pixel signal $D_1$, $D_2$ or $D_3$ and outputs the status signal St206.

Encoder 71 having the composition shown in FIG. 4 produces code 207 by encoding with the aforesaid arithmetic code such as Markov model code based on the pixel signal D203 and status signal St206 via the transmission line etc and the code 207 is transmitted to decoder 74.

At decoder 74, the transmitted code 207 is decoded and decoded pixel signals $D_1'$, $D_2'$ and $D_3'$ are stored in the frame memory in the decoder 74 and then the RGB converter 75 executes the calculation in reverse to that of the aforesaid difference converter 70 to return the signals into one bit binary color signals of R', G' and B' and based on such data, color image is displayed and recorded.

FIG. 15 is the block diagram of status prediction circuit 73 shown in FIG. 14. The reference pixels used for prediction of the status are 12 pixels A–L shown in FIG. 16 and they are all 1 bit pixel data. The mark * indicates the position of the pixel under attention for encoding. In FIG. 15, 142–153 are 12 pieces of latch to memorize the pixels around the pixel under attention and A latch 142 holds the data of the pixel one pixel prior to the pixel to be encoded while B latch holds the data of the pixel two pixels prior. Likewise, C–G latches 144–148 holds the pixel data of 1 line prior and H–L latches 49–53 hold the pixel data of 2 lines prior. The status of the data of these 12 pixels produce the status signal St206 of 12 bit and it is output at encoder 71. 72-1–72-3 are the line memories for obtaining the pixels surrounding the pixel under attention. Reference pixels, however, are not limited to 12 pixels as stated above.

As aforesaid status prediction circuit 73 transmits the status signal St206 which indicates the status of the data of surrounding pixels to encoder 71. This status signal St206 becomes the signal for prediction of pixel data of the pixel to be encoded by encoder 71.

In the present embodiment stated above, G data of the color image bit plane are encoded first as the first plane and then the difference of R data and G data. The difference signal of B data and G data are sequentially encoded but it is possible to encode other data first. In the present embodiment, the differences between G data and R and B data were used but the same effect is obtained when another operation or logic is used.

The aforesaid system may be applied not only to R, G and B data but also to other color data such as Y, M and C data.

In the embodiment shown in FIG. 14, a dynamic arithmetic code was used for encoding, but encoding can be made also by using run length encoding method such as MH, MMR, etc.

FIG. 17 shows an example which uses MMR encoder. As in the case of FIG. 14, the difference of input data 201, 202 and 203 of one bit each of R, G and B which express each pixel of color image is obtained by difference converter 70 in the same way as stated above and they are converted into pixel signal $D_1$, $D_2$ and $D_3$ and plane sequentially output at MMR encoder 76. Encoding is done by MMR encoder 76 for each of the bit plane $D_1$, $D_2$ and $D_3$ and together with the header to show each plane, they are transmitted by the transmission route 207.

At decoder 77, decoding is conducted for each of the received plane ($D_1$, $D_2$ and $D_3$) and decoded data are stored in the frame memory 78 plane by plane.

When the operation is over for all bit planes $D_1$, $D_2$ and $D_3$, it is possible to return the data into binary color data of each one bit of R', G' and B' by conducting the calculation in reverse to the difference conversion by RGB converter 75. Explanation of the operation by MMR is omitted as it is the well known technology.

As explained above the present method increases the efficiency of binary color image encoding utilizing correlation between three original colors. To be more specific, in the encoding of three original color bit planes, after encoding the first plane, the second and third planes are encoded by calculation of the difference between the first plane and the second and third planes, thereby establishing correlation of colors.

Besides, when a black & white image is encoded by this system, it is enough to use the amount of codes used roughly for one original color plane. Even with color images partially containing black & white image, encoding efficiency is much higher than the conventional.

As explained above, under the method of the present invention, in the encoding of color image signals expressed by a plural number of color component signals, certain color component signals are encoded as they are while other in the frame memory 78 plane by plane.

When the operation is over for all bit planes $D_1$, $D_2$ and $D_3$, it is possible to return the data into binary color data of each one bit of R', G' and B' by conducting the calculation in reverse to the difference conversion by RGB converter 75. Explanation of the operation by MMR is omitted as it is the well known technology.

As explained above, the present method increases the efficiency of binary color image encoding utilizing correlation between three original colors. To be more specific, in the encoding of three original color bit planes, after encoding the first plane, the second and third planes are encoded by calculation of the difference between the first plane and the second and third planes, thereby establishing correlation of colors.

Besides, when a black & white image is encoded by this system, it is enough to use the amount of codes used roughly for one original color plane. Even with the color image partially containing black & white image, encoding efficiency is much higher than the conventional.

As explained above, under the method of the present invention, in the encoding of color image signals expressed by a plural number of color component signals, certain color component signals are encoded as they are, while others require greatly changing the hardwares of the m bit color image encoding system.

Figure 18:
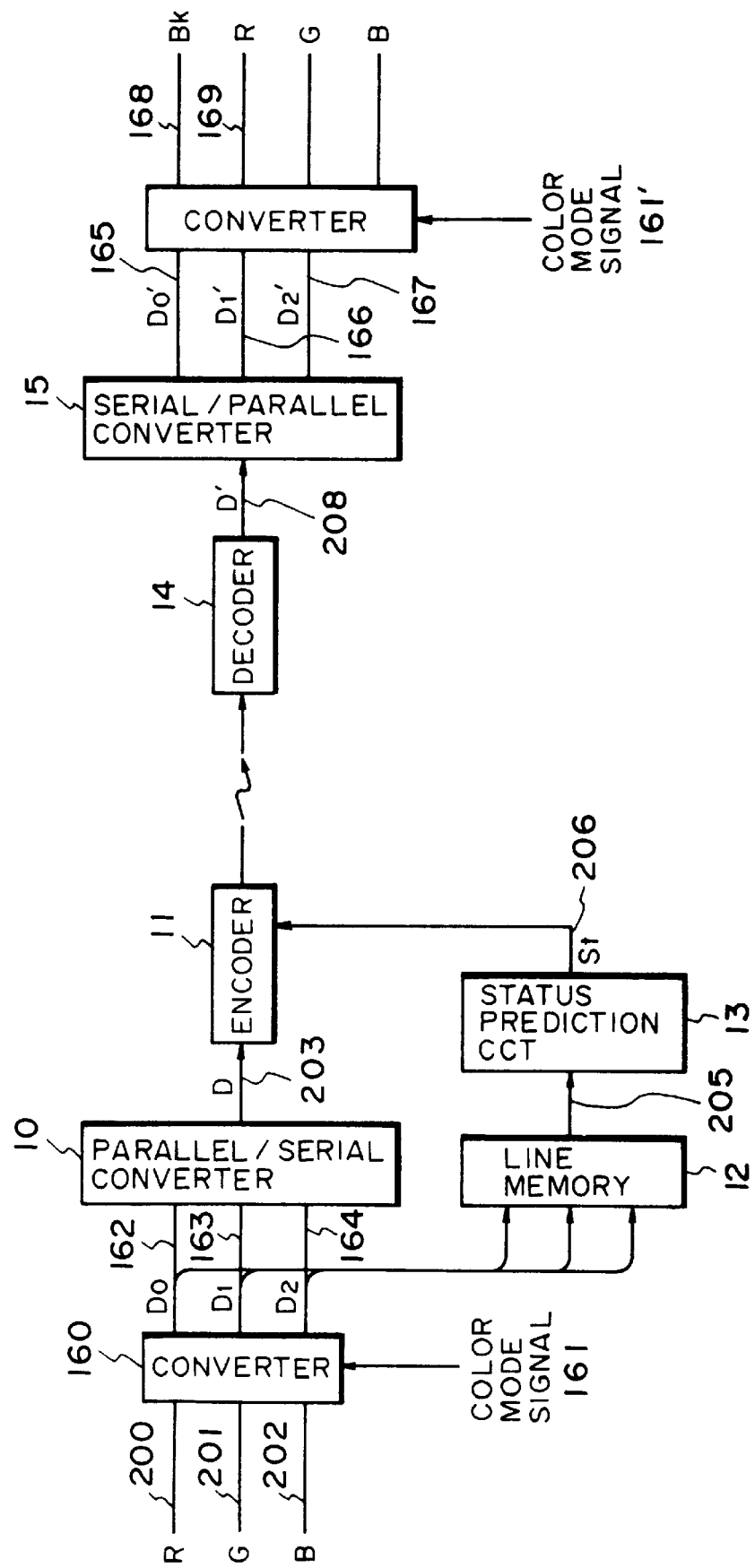
FIG. 18 is a conceptual drawing of a color image transmission system which employs a signal converter.

FIG. 18 is an embodiment of color image transmission device to which the above concept is applied.

In FIG. 18 the same block and signal lines as those indicated in FIG. 3 etc. are given the same number and their explanations are omitted here.

One bit each R, G and B input data 200–202 which express each pixel of a color image are signal-converted according to color mode signal 161 at converter 160.

When color mode is 3 bit colors (in case of eight colors) R, G and B signals are directly connected to $D_0$–$D_2$ signals. When color mode is, for example, three colors (white, black and red), conversion is made at the converter 16 for white (111→110), black (000→000) and red (100→100) as shown in Table 5(a). Thus all the lowest position bits become 0 and color discrimination is made only by the two upper bits. Here, however, 010 is undefined.

Since all the lowest position bits are zero, the amount of encoding of the lowest position bit plane is extremely small irrespective of the kind of encoding system and thus the amount of is less than the case when 3 bits are encoded as they are. In another example where color mode is four colors (white, black, green and blue), conversion is made for white (111→110), black (000→000), blue (001→010) and green (010→100) as shown in Table 5 and as in the aforesaid example, all the lowest position bits become zero and color discrimination is made only by the upper 2 bits. In another example where color mode is two colors (white and black), conversion is made for white (111→100) and black (000→000) as shown in Table 5(c) and all two lower position bits become zero and color discrimination is made only by the upper most bit. Since all each of the two lower position bits become zero, the amount of encoding is less than the case when 3 bits are encoded as they are.

As shown above, by a slight modification wherein data a conversion circuit is added to 3 bit color encoder, efficient encoding of 2–4 color signals can be achieved.

Color data signals $D_0$–$D_2$ 212, 213 and 214 which have been converted as aforesaid by the converter 160 of FIG. 18 are further converted into serial signals by a parallel/serial converter and the converted serial signal D203 is transmitted to the encoder 11.

On the other hand, color data 162, 163 and 164 are stored in the line memory 12 having the capacity of a plural number of lines and together with the data of the line several lines prior to it, they are input into status prediction circuit 13 as the output signal 205. At the status prediction circuit 13, the status of each pixel to be encoded is determined by the output signal given by line memory 12 and status signal St206 which indicates the status of encoding is given out. At encoder 11, code 207 is formed by the encoding method to use, for example, arithmetic code based on the serial signal D203 and status signal St206 as stated above and it is transmitted to decoder 14. Encoder 11 can be formed with the same composition as that shown in FIG. 13.

At decoder 14, the transmitted code 207 is decoded to prepare decoded serial signal S' 208. Such signal D' 208 is returned to one bit of each color data $D_0$', $D_1$' and $D_2$' 165–167 by the serial/parallel converter 15. They are further converted into signals Bk168, R169, etc. for color recording by color mode signal 221 at the converter 17 and transmitted to the color image display device not shown in the figure. Color mode signal 161' must be transmitted as the header information prior to the transmission of image data.

FIG. 19 explains the reference pixel for determination of encoding state St206.

FIG. 19(a) indicates the reference pixel of encoded first signal ($D_0$ 212 in the case of the present embodiment) and it indicates that seven pixels already encoded at around the pixel to be encoded which is indicated by * are used for reference. FIG. 19(b) shows the reference pixel of encoded second signal ($D_1$ 213 in the case of the present embodiment) and it indicates that seven pixels as used in FIG. 19(a) and a pixel at the same position as the first color, in total eight colors, are used for reference. FIG. 19(c) shows the reference pixel of third signal ($D_2$ 214 in the case of the present embodiment) and it indicates that seven pixels as used in FIG. 19(a) and two additional pixels at the first color position and second color position, in total nine pixels, are used for reference.

As aforesaid, in the present embodiment, it is so arranged that by utilizing the correlation between the signals of the same pixel, the encoding conditions can be properly set. These reference pixels can be obtained with the same composition as that shown in FIG. 6.

The above explanations apply to the embodiment of the present invention for encoding of color signals to be input and output dot-sequentially but the same prediction is possible also for the signal input and output plane-sequentially.

Figure 20:
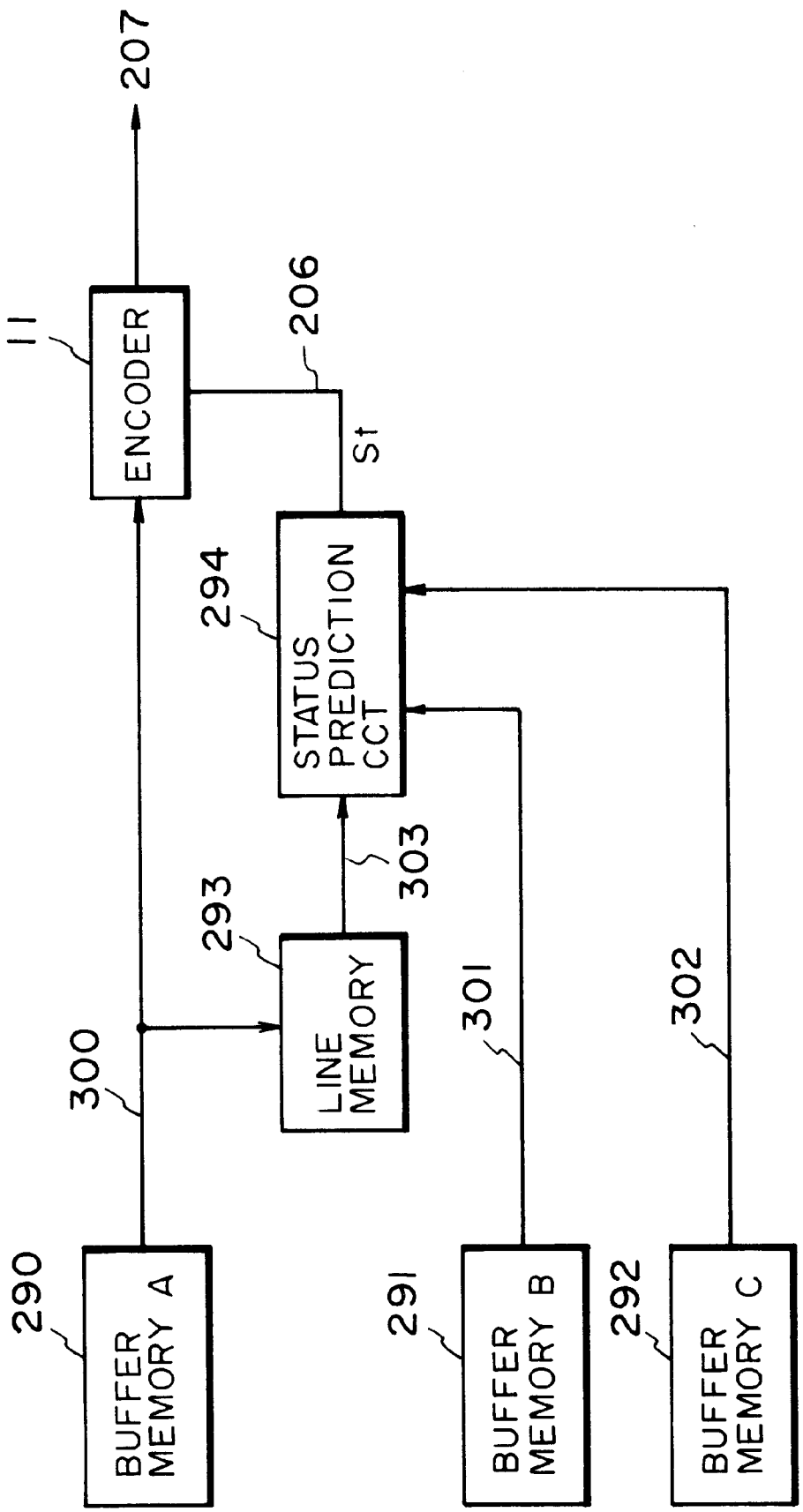
FIG. 20 is a drawing to show an embodiment of the face sequential system.

FIG. 20 is an embodiment of plane-sequential system. Buffer memories 290, 291 and 292 memorize the color signals of all picture planes of $D_0$, $D_1$ and $D_2$. The signal to be encoded now is entered in the buffer memory 290. It is assumed that other signals are all memorized in buffer memory 291 and 292 having been encoded. Signal 300 coming from the buffer memory 290 is delivered to the encoder 11. It is also delayed by line memory 293 and together with a few other lines it is transmitted to status prediction circuit 294. Buffer memory 291 and 292 transmit the received signals 301 and 302 to the status prediction circuit 294. By these signals, prediction status signal St206 is produced and transmitted to encoder 11. Then at encoder 11, code 207 is produced by image signal 300 and the St signal.

As explained above, for the color image of which only n colors out of m bit color signals are encoded, a color image of n colors can be efficiently encoded with this system without greatly modifying the hardware of the m bit color image encoding system.

The present invention was explained above in reference to a few preferred embodiments, but needless to say, the present invention is not limited to these embodiments. Various modification and changes are possible within the scope of the Claim.

TABLE 1

| I | MC |
|---|-----|
| 1 | 2 |
| 2 | 1 |
| 3 | 1 |
| 4 | 1 |
| 5 | 2 |
| 6 | 4 |
| 7 | 5 |
| 9 | 11 |
| 10 | 15 |
| 11 | 22 |
| 12 | 30 |
| 13 | 43 |
| 14 | 61 |
| 15 | 87 |
| 16 | 120 |
| 17 | 174 |
| 18 | 241 |
| 19 | 348 |
| 20 | 483 |

TABLE 2

| D | MPS | YN |
|---|-----|-----|
| 0 | 0 | 0 |
| 0 | 1 | 1 |
| 1 | 0 | 1 |
| 1 | 1 | 0 |

TABLE 3

| | | d = 1 | | | d = 2 | | |
|---|---|---|---|---|---|---|---|
| | UPA = UPB = 0 | UPA = 1 | UPB = 1 | | UPA = 1 | UPB = 1 | |
| I | I' | I' | I' | EX | I' | I' | EX |
| 1 | 1 | 2 | 1 | 1 | 3 | 1 | 1 |
| 2 | 2 | 3 | 1 | 0 | — | — | — |
| 3 | 3 | 4 | 2 | 0 | 5 | 1 | 0 |
| 4 | 4 | 5 | 3 | 0 | — | — | — |
| 5 | 5 | 6 | 4 | 0 | 7 | 3 | 0 |
| 6 | 6 | 7 | 5 | 0 | — | — | — |
| 7 | 7 | 8 | 6 | 0 | 9 | 5 | 0 |
| 8 | 8 | 9 | 7 | 0 | — | — | — |
| 9 | 9 | 10 | 8 | 0 | 11 | 7 | 0 |
| 10 | 10 | 11 | 9 | 0 | — | — | — |
| 11 | 11 | 12 | 10 | 0 | 13 | 9 | 0 |
| 12 | 12 | 13 | 11 | 0 | — | — | — |
| 13 | 13 | 14 | 12 | 0 | 15 | 11 | 0 |
| 14 | 14 | 15 | 18 | 0 | — | — | — |
| 15 | 15 | 16 | 14 | 0 | 17 | 13 | 0 |
| 16 | 16 | 17 | 15 | 0 | — | — | — |
| 17 | 17 | 18 | 16 | 0 | 19 | 15 | 0 |
| 18 | 18 | 19 | 17 | 0 | — | — | — |
| 19 | 19 | 20 | 18 | 0 | 21 | 17 | 0 |
| 20 | 20 | 21 | 19 | 0 | — | — | — |
| 21 | 21 | 21 | 20 | 0 | 21 | 19 | 0 |

(—) indicates don't care.

TABLE 4

| Effective probability | Coefficient | | Encoding parameter | | |
| --- | --- | --- | --- | --- | --- |
| I | $q_c$ | $q_1$ | $q_2$ | $Q_1$ | $Q_2$ | $Q_3$ |
| 1 | 0.5000 | $2^{-2}$ | $2^{-2}$ | 2 | 2 | + |
| 2 | 0.4375 | $2^{-1}$ | $2^{-4}$ | −1 | 4 | − |
| 3 | 0.3750 | $2^{-2}$ | $-2^{-3}$ | 2 | 3 | + |
| 4 | 0.3125 | $2^{-2}$ | $2^{-4}$ | 2 | 4 | + |
| 5 | 0.2500 | $2^{-3}$ | $2^{-3}$ | 8 | 3 | + |
| 6 | 0.1875 | $2^{-3}$ | $2^{-4}$ | 3 | 4 | + |
| 7 | 0.1250 | $2^{-4}$ | $2^{-4}$ | 4 | 4 | + |
| 8 | 0.0938 | $2^{-4}$ | $2^{-5}$ | 4 | 5 | + |
| 9 | 0.0625 | $2^{-5}$ | $2^{-5}$ | 5 | 5 | + |
| 10 | 0.0469 | $2^{-5}$ | $2^{-6}$ | 5 | 6 | + |
| 11 | 0.0313 | $2^{-6}$ | $2^{-6}$ | 6 | 6 | + |
| 12 | 0.0234 | $2^{-7}$ | $2^{-7}$ | 6 | 7 | + |
| 13 | 0.0156 | $2^{-7}$ | $2^{-7}$ | 7 | 7 | + |
| 14 | 0.0117 | $2^{-7}$ | $2^{-8}$ | 7 | 8 | + |
| 15 | 0.0078 | $2^{-8}$ | $2^{-8}$ | 8 | 8 | + |
| 16 | 0.0059 | $2^{-8}$ | $2^{-9}$ | 8 | 9 | + |
| 17 | 0.0039 | $2^{-8}$ | $2^{-10}$ | 9 | 9 | + |
| 18 | 0.0029 | $2^{-9}$ | $2^{-10}$ | 9 | 10 | + |
| 19 | 0.0020 | $2^{-10}$ | $2^{-10}$ | 10 | 10 | + |
| 20 | 0.0015 | $2^{-10}$ | $2^{-11}$ | 10 | 11 | + |
| 21 | 0.0010 | $2^{-11}$ | $2^{-11}$ | 11 | 11 | + |

TABLE 5

| Color | 3-bit input | $D_0 D_1 D_2$ after conversion |
| --- | --- | --- |
| (a) | | |
| White | 1 1 1 | 1 1 0 |
| Black | 0 0 0 | 0 0 0 |
| Red | 1 0 0 | 1 0 0 |
| Undefined | | 0 1 0 |
| (b) | | |
| White | 1 1 1 | 1 1 0 |
| Black | 0 0 0 | 0 0 0 |
| Red | 0 0 1 | 0 1 0 |
| Green | 0 1 0 | 1 0 0 |
| (c) | | |
| White | 1 1 1 | 1 0 0 |
| Black | 0 0 0 | 0 0 0 |

We claim:

1. A color image encoding method to encode each of a plural number of color component signals representing a color image, which is characterized in that one of the color component signals to be encoded and color component signals other than the one to be encoded are used as reference signals, where said color component signal to be encoded is first predicted according to the reference signals and then said color component signal to be encoded is encoded utilizing the predicted color component signal.

2. A method according to claim 1 wherein a color component signal of a previous pixel already encoded is also used as a reference signal.

3. A method according to claim 1 wherein said plural number of color component signals are encoded dot-sequentially.

4. A method according to claim 1 wherein said plural number of color component signals are red (R), green (G) and blue (B).

5. A color image encoding method to encode color image signals expressed by a plural number of color component signals, which is characterized in that a difference between a specific color component signal and other color component signals is obtained and the specific color component signal is encoded as is, while for said other color component signals, differences between said specific color component signal and said other component signals are encoded.

6. A method according to claim 5 wherein said encoding is prediction encoding.

7. A method according to claim 5 wherein one frame of said specific color component signal is encoded and then one frame of the differences between said specific color component signal and the other color component signals is encoded.

8. A method according to claim 5 wherein the plural number of color component signals are red (R), green (G) and blue (B).

9. A color image encoding apparatus to encode each of a plural number of color component signals representing a color image, comprising:

referring means for referring one of the color component signals to be encoded and color component signals other than the one to be encoded as reference signals;

prediction means for predicting the color component signal to be encoded according to the reference signals; and encoding means for encoding the color component signal to be encoded utilizing the color component signal predicted by said predicting means.

10. An apparatus according to claim 9 wherein a color component signal of a previous pixel already encoded is also used as a reference signal.

11. An apparatus according to claim 9 wherein the plural number of color component signals are encoded by said encoding means dot-sequentially.

12. An apparatus according to claim 9 wherein the plural number of color component signals are red (R), green (G) and blue (B).

13. A color image encoding apparatus to encode color image signals expressed by a plural number of color component signals, comprising:

obtaining means for a difference between a specific color component signal and other color component signals; and encoding means for encoding the specific color component signal as is and, for the other color component signals, encoding the differences between the specific color component signal and the other component signals.

14. An apparatus according to claim 13 wherein said encoding means uses prediction encoding.

15. An apparatus according to claim 13 wherein said encoding means encodes one frame of said specific color component signal and then encodes one frame of the difference between said specific color component signal and the other color component signals.

16. An apparatus according to claim 13 wherein the plural number of color component signals are red (R), green (G) and blue (B).

* * * * *

UNITED STATES PATENT AND TRADEMARK OFFICE
CERTIFICATE OF CORRECTION

PATENT NO. : 5,903,366

DATED : May 11, 1999

INVENTOR(S) : YASUJI HIRABAYASHI ET AL.

It is certified that error appears in the above-identified patent and that said Letters Patent is hereby corrected as shown below:

COLUMN 1 line 10, "image." should read --images.--; and
   line 66, "includes" should read --hinders--.

COLUMN 2 line 15, "images" should read --images,--;
   line 48, "the" should read --a--; and "a" should read --the--; and
   line 63, "the" (1st occurrence) should read --a-.

COLUMN 3 line 59, "St206 which" should read --St206, which-- and "encoding is" should read --encoding, is--.

COLUMN 4 line 9, "G signal" should read --the G signal--;
   line 53, "7 pixel" should read --7 pixels--; and
   line 66, "which" should be deleted.

UNITED STATES PATENT AND TRADEMARK OFFICE
CERTIFICATE OF CORRECTION

PATENT NO. : 5,903,366

DATED : May 11, 1999

INVENTOR(S) : YASUJI HIRABAYASHI ET AL.

It is certified that error appears in the above-identified patent and that said Letters Patent is hereby corrected as shown below:

COLUMN 5 line 1, "40-42" should read --40-42 which--; and
   line 12, "1st" should read --first--.

COLUMN 8 line 15, "examples" should read --example,--; and
   line 34, "operations" should read --operation,--.

COLUMN 9 line 23, "$A_{s1}$" should read --$A_{s1}$--.

COLUMN 11 line 34, "embodiments" should read --embodiment,--; and
   line 58, "of" should read --of the--.

UNITED STATES PATENT AND TRADEMARK OFFICE
CERTIFICATE OF CORRECTION

PATENT NO. : 5,903,366

DATED : May 11, 1999

INVENTOR(S) : YASUJI HIRABAYASHI ET AL.

It is certified that error appears in the above-identified patent and that said Letters Patent is hereby corrected as shown below:

COLUMN 14

```
line 8,  "other" should read --others--;
line 9,  "78 plane" should read --78 are plane--;
line 54, "of" should be deleted; and
line 65, "all" should be deleted.
```

COLUMN 15

```
line 1, "data a" should read --a data--.
```

COLUMN 16

```
line 9, "modification" should read --modifications--; and
Table 1 "7   5" should read       7   5
         9  11                  --8   8--
                                  9  11

Table 3 "12 should read      12
         18                --13--
         14                  14
```

UNITED STATES PATENT AND TRADEMARK OFFICE
CERTIFICATE OF CORRECTION

PATENT NO. : 5,903,366

DATED : May 11, 1999

INVENTOR(S) : YASUJI HIRABAYASHI

It is certified that error appears in the above-identified patent and that said Letters Patent is hereby corrected as shown below:

<u>COLUMN 17</u>

Table 4       "2  0.4375  $2^{-1}$  $2^{-4}$" should read
--2  0.4375  $2^{-1}$  $-2^{-4}$--;

"3  0.3750  $2^{-2}$  $-2^{-3}$" should read
--3  0.3750  $2^{-2}$  $2^{-3}$--;

"5  0.2500  $2^{-3}$  $2^{-3}$  8" should read
--5  0.2500  $2^{-3}$  $2^{-3}$  3--;

"12  0.0234  $2^{-7}$" should read
--12  0.0234  $2^{-6}$--; and

UNITED STATES PATENT AND TRADEMARK OFFICE
CERTIFICATE OF CORRECTION

PATENT NO. : 5,903,366

DATED : May 11, 1999

INVENTOR(S) : YASUJI HIRABAYASHSI ET AL.  Page 5 of 5

It is certified that error appears in the above-identified patent and that said Letters Patent is hereby corrected as shown below:

COLUMN 17

Table 4  "17  0.0039  $2^{-8}$  $2^{-10}$" should read
--17  0.0039  $2^{-9}$  $2^{-9}$--.

Signed and Sealed this

Second Day of May, 2000

Attest:

Q. TODD DICKINSON

Attesting Officer  Director of Patents and Trademarks